United States Patent
Demirel et al.

(10) Patent No.: US 10,086,365 B2
(45) Date of Patent: Oct. 2, 2018

(54) STRENGTHENED IRON CATALYST FOR SLURRY REACTORS

(75) Inventors: Belma Demirel, Longmont, CO (US); Charles B. Benham, Arvada, CO (US); Dan Fraenkel, Boulder, CO (US); Richard A. Bley, Longmont, CO (US); Jesse W. Taylor, Westminster, CO (US); Sara L. Rolfe, Loveland, CO (US); Harold A. Wright, Longmont, CO (US)

(73) Assignee: RES USA, LLC, Westminster, CO (US)

( * ) Notice: Subject to any disclaimer, the term of this patent is extended or adjusted under 35 U.S.C. 154(b) by 0 days.

(21) Appl. No.: 12/198,459

(22) Filed: Aug. 26, 2008

(65) Prior Publication Data

US 2009/0062108 A1    Mar. 5, 2009

Related U.S. Application Data

(60) Provisional application No. 60/969,077, filed on Aug. 30, 2007, provisional application No. 61/028,635, filed on Feb. 14, 2008.

(51) Int. Cl.
*B01J 37/03* (2006.01)
*B01J 23/78* (2006.01)
(Continued)

(52) U.S. Cl.
CPC .............. *B01J 23/78* (2013.01); *B01J 21/005* (2013.01); *B01J 37/03* (2013.01); *C10G 2/331* (2013.01); *B01J 21/08* (2013.01); *C10G 2300/70* (2013.01)

(58) Field of Classification Search
USPC ............... 502/158, 104, 330; 518/719, 721
See application file for complete search history.

(56) References Cited

U.S. PATENT DOCUMENTS

| | | | |
|---|---|---|---|
| 4,436,834 A | 3/1984 | Wright | |
| 4,605,639 A * | 8/1986 | Dyer et al. .................. | 502/331 |

(Continued)

FOREIGN PATENT DOCUMENTS

| | | |
|---|---|---|
| CN | 1176243 | 3/1998 |
| CN | 1404920 | 3/2003 |

(Continued)

OTHER PUBLICATIONS

Fischer_Tropsch Synthesis:Activation of Low-Alpha Potassium Promoted Ion Catalyst by Luo et al. Fuel Processing Technology, vol. 83, Issue 1-3. Sep. 15, 2003, p. 49-65.*

(Continued)

*Primary Examiner* — Colin W Slifka
*Assistant Examiner* — Colette Nguyen
(74) *Attorney, Agent, or Firm* — Porter Hedges LLP; Timothy S. Westby

(57) ABSTRACT

A method of strengthening a precipitated unsupported iron catalyst by: preparing a precipitated unsupported iron catalyst containing copper and potassium; adding a solution comprising a structural promoter to the previously prepared catalyst; drying the mixture; and calcining the dried catalyst. A method for preparing an iron catalyst, the method comprising: precipitating a catalyst precursor comprising iron phases selected from hydroxides, oxides, and carbonates; adding a promoter to the catalyst precursor to yield a promoted precursor; drying the promoted precursor to yield dried catalyst; and calcining the dried catalyst, wherein the catalyst further comprises copper and potassium. A method of preparing a strengthened precipitated iron catalyst comprising: co-precipitating iron, copper, magnesium, and aluminum; washing the precipitate; alkalizing the precipitate; and drying the precipitate to yield a dried catalyst precursor.

(Continued)

The dried catalyst precursor may be calcined and treated with a gas comprising carbon monoxide.

30 Claims, 10 Drawing Sheets

(51) Int. Cl.
  *B01J 21/00* (2006.01)
  *C10G 2/00* (2006.01)
  *B01J 21/08* (2006.01)

(56) References Cited

U.S. PATENT DOCUMENTS

| | | | |
|---|---|---|---|
| 4,994,428 A * | 2/1991 | Bell et al. | 502/330 |
| 5,324,335 A | 6/1994 | Benham et al. | |
| 5,504,118 A * | 4/1996 | Benham | B01J 23/78 |
| | | | 518/719 |
| 5,585,316 A | 12/1996 | Nay et al. | |
| 5,733,839 A | 3/1998 | Espinoza et al. | |
| 6,627,666 B1 | 9/2003 | Pedersen et al. | |
| 6,653,357 B1 * | 11/2003 | Espinoza | C07C 1/043 |
| | | | 518/715 |
| 6,756,411 B2 * | 6/2004 | Betts | C07C 1/0435 |
| | | | 518/700 |
| 6,777,452 B2 | 8/2004 | Zhou et al. | |
| 6,844,370 B2 * | 1/2005 | Espinoza et al. | 518/719 |
| 7,067,562 B2 * | 6/2006 | Espinoza | B01J 23/8946 |
| | | | 518/717 |
| 7,199,077 B2 * | 4/2007 | Hu et al. | 502/325 |
| 7,598,295 B2 * | 10/2009 | Bromfield | B01J 23/862 |
| | | | 518/714 |
| 7,915,193 B2 | 3/2011 | Demirel et al. | |
| 2003/0043734 A1 | 3/2003 | Takeguchi | |
| 2003/0162850 A1 * | 8/2003 | Espinoza et al. | 518/719 |
| 2004/0009871 A1 | 1/2004 | Hu et al. | |
| 2004/0122115 A1 * | 6/2004 | Espinoza | B01J 23/8946 |
| | | | 518/721 |
| 2004/0204504 A1 * | 10/2004 | Malek | B01J 23/75 |
| | | | 518/717 |
| 2004/0204505 A1 * | 10/2004 | Malek | B01J 23/75 |
| | | | 518/717 |

FOREIGN PATENT DOCUMENTS

| | | |
|---|---|---|
| CN | 1593757 | 3/2005 |
| CN | 1600421 | 3/2005 |
| CN | 1714933 | 1/2006 |
| EP | 1657290 | 5/2006 |
| GB | 717644 | 10/1954 |
| WO | 0218043 | 3/2002 |
| WO | 2009022261 | 2/2009 |
| WO | 2009032701 | 3/2009 |
| WO | 2009137803 | 11/2009 |
| WO | 2009148951 | 12/2009 |
| WO | 2009148952 | 12/2009 |
| ZA | 201103406 | 7/2012 |

OTHER PUBLICATIONS

Activity and Selectivity of Precipitated Iron Fischer-Tropsch Catalysts by Robert J. Obrien et al. Catalysis Today (1997) 325-334.*
Activity and Selectivity of precipitated iron Fishcer-Tropsch catalysts. Robert J. O'Brien et al. Catalyst Today (1997) 325-334.*
Activity and Selectivity of Precipiated Iron Fischer-Tropsch catalysts. By Robert J. O'Brien et al. Catalysis Today 36 (1997) 325-334.*
Fischer-Tropsch synthesis: activation of low-alpha potassium promoted iron catalysts. Mingsheng Luo et al. (Fuel Processing Technology 83 (2003) 49-65.*
Aactivation Study of Precipitated Iron Fischer-Tropsch Catalysts. Robert J. O'Brien et al. Energy &Fuels 1996, 10, 921-926.*
(Fischer-Tropsch synthesis:activation of low-alpha potassium promoted iron catalysts. Flel Processing technology 83(2003-49-65).*
International Search Report, International Application No. PCT/US2008/074484, dated Feb. 25, 2009.
Attrition Resistance of Spray-Dried Iron F-T Catalysts: Effect of Activation Conditions (Ron Zhao et al.) Catalysis Today (2002) 319-326.
International Search Report dated Jun. 24, 2010 for corresponding International Application No. PCT/US2009/064895. (11 pgs.).
Canadian Office Action dated Aug. 15, 2011 for corresponding Canadian Application No. 2,698,123 (3 pgs.).
Chinese Office Action dated Oct. 10, 2012 for corresponding Chinese Application No. 200880111610.1 (8 pgs.).
AU Office Action dated Mar. 14, 2012 for AU Serial No. 2008296486; 3 pages.
European Search Report for EP Application No. 08798813.5 dated Mar. 27, 2012; 13 pages.
Kandis Sudsakorn et al: "Preparation of Attrition-Resistant Spray-Dried Fe Fishcher-Tropsch Catalysts using Precipitated SiO 2", Industrial & Engineering Chemistry Research, vol. 40, No. 22, Oct. 1, 2001, pp. 4778-4784.
English Translation of CN 1593757 dated Apr. 18, 2012; 7 pages.
English Translation of CN 100460066C dated Apr. 18, 2012, 5 pages.
Australian Examination Report dated Apr. 15, 2013 for corresponding Australian Application No. 2008296486 (3 pgs.).
Canadian Office Action dated Apr. 16, 2013 for corresponding Canadian Application No. 2,698,123 (2 pgs.).
O'Brien et al., "Activity and Selectivity of Precipitated Iron Fischer-Tropsch Catalysts," Catalysis Today vol. 36, dated 1997, pp. 325-334 (10 pgs.).
Juo et al. "Fischer-Tropsch Synthesis: Activation of Low-Alpha Potassium Promoted Iron Catalysts," Fuel Processing Technology, vol. 83, dated 2003, pp. 49-65 (17 pgs.).
Chinese Office Action dated Jan. 21, 2013 for corresponding Chinese Application No. 200980146150.0 (7 pgs.).
European Search Report dated Dec. 4, 2012 for corresponding European Application No. 09828131.4 (18 pgs.).
Eurasian Office Action dated Jan. 14, 2013 for corresponding Eurasian Application No. 201170556/28 (4 pgs.).
European Examination Report dated Feb. 13, 2013 for corresponding European Application No. 08798813.5 (7 pgs.).
Office Action dated May 18, 2012 for corresponding Canadian Application No. 2,698,123 (2 pgs.).
Office Action dated May 18, 2012 for corresponding Australian Application No. 2009316748 (3 pgs.).
Chinese Office Action dated Aug. 19, 2013 for corresponding Chinese Application No. 200980146150.0 (7 pgs.).
Second Australian Examination Report dated Jul. 25, 2013 for corresponding Australian Application No. 2009316748 (3 pgs.).
Canada Office Action dated Sep. 26, 2013 for corresponding Canadian Application No. 2,744,051 (2 pgs.).
Chinese Office Action dated May 5, 2013 for corresponding Chinese Application No. 200880111610.1 (5 pgs.).
Australian Examination Report dated Oct. 28, 2013 for corresponding Australian Application No. 2009316748 (4 pgs.).
Canadian Office Action dated Nov. 20, 2013 for corresponding Canadian Application No. 2,698,123 (2 pgs.).
European Examination Report dated Jul. 8, 2014 for corresponding European Application No. 08798813.5-1352 (5 pgs.).
India Examination Report dated Apr. 29, 2014 for corresponding India Application No. 1483/DELNP/2010 (2 pgs.).
Canada Office Action dated Aug. 25, 2014 for corresponding Canadian Application No. 2,698,123 (2 pgs.).
European Office Action dated Apr. 8, 2015 for corresponding European Application No. 08798813.5-1352 (5 pgs.).
India Office Action dated Feb. 19, 2015 for corresponding India Application No. 4394/DELNP/2011 (3 pgs.).
European Search Report dated Jan. 23, 2015 for corresponding European Application No. 09828131.4-1352 (9 pgs.).
Extended European Search Report dated Oct. 26, 2016 for corresponding European Application No. 16178789.0, (12 pgs.).

(56) References Cited

OTHER PUBLICATIONS

Office Action issued Jun. 6, 2016 in corresponding European Application No. 09828131.4, (4 pgs.).
European Examination Report dated Apr. 20, 2017 for corresponding European Application No. 09828131.4, (8 pgs.).
Office Action dated May 11, 2015 for corresponding Australian application 2014200165; 3 pgs.
Office Action dated Oct. 29, 2015 for counterpart AU Application No. 2013242856 (5 pgs).

* cited by examiner

STRENGTHENED IRON CATALYST FOR SLURRY REACTORS

CROSS-REFERENCE TO RELATED APPLICATIONS

This application claims the benefit under 35 U.S.C. § 119(e) of U.S. Provisional Patent Application No. 60/969,077 filed Aug. 30, 2007 and U.S. Provisional Patent Application No. 61/028,635 filed Feb. 14, 2008, the disclosures of which are hereby incorporated herein by reference.

STATEMENT REGARDING FEDERALLY SPONSORED RESEARCH OR DEVELOPMENT

Not Applicable.

BACKGROUND OF THE INVENTION

Field of the Invention

The present invention relates generally to an improved catalyst for use in Fischer-Tropsch processes. More particularly, the present invention relates to a method of improving the structural integrity of a Fischer-Tropsch catalyst without losing substantial catalytic activity and selectivity toward heavy hydrocarbons. Still more specifically, the present invention relates to a method of producing a Fischer-Tropsch catalyst containing a structural support such as a binder incorporated after precipitation of the catalyst precursor or a support material coprecipitated with iron. The support material increases the structural integrity of the catalyst. The catalyst of the present disclosure may comprise coprecipitated material selected from iron, silica, magnesium, copper, aluminum, and combinations thereof. Alternatively, or additionally, potassium silicate binder, colloidal silica, and/or tetraethyl ortho silicate (TEOS) may be added to a precipitated catalyst to increase the strength thereof.

Background of the Invention

The Fischer-Tropsch (FT) technology is used to convert a mixture of hydrogen and carbon monoxide (synthesis gas or syngas) to valuable hydrocarbon products. Often, the process utilizes a slurry bubble column reactor (SBCR). The technology of converting synthesis gas originating from natural gas into valuable primarily liquid hydrocarbon products is referred to as Gas To Liquids (GTL) technology. When coal is the raw material for the syngas, the technology is commonly referred to as Coal-To-Liquids (CTL). The FT technology is one of several conversion techniques included in the broader GTL/CTL technology.

One of the primary difficulties encountered in using iron-based catalysts for carrying out the FT reaction in a slurry bubble column reactor (SBCR) is the breakdown of the initial catalyst particles into very small particles, i.e. less than 5 microns in size. Although the small particle size is advantageous for increasing surface area and reaction rate of the catalyst, the problem lies in separating the small catalyst particles from the wax slurry medium. Separating the catalyst particles from the wax is necessary since the iron catalyst when operated under the most profitable conditions wherein wax is produced requires removal of the wax from the reactor to maintain a constant height of slurry in the reactor.

There are at least three modes of iron catalyst breakdown. First, when the catalyst undergoes activation, the starting material, hematite, is converted to iron carbides which have different structures and density. The induced stresses from the transformation lead to particle breakage. Second, if the reactor is operated at high temperature, e.g. greater than about 280° C., or at low $H_2$:CO ratio, e.g. less than about 0.7, carbon formation via the Boudouard reaction can pry the particles apart. Third, mechanical action can cause breakup of the particles due to catalyst particles impinging each other or the reactor walls.

It is impossible to determine the actual attrition resistance required without knowing the type of reactor system, the type of wax/catalyst separation system and the system operating conditions.

Heretofore, attempts at developing strengthened iron-based catalysts have focused on producing the strongest possible catalysts, regardless of the actual strength required for a particular system. Such approaches sacrifice activity and selectivity for catalyst strength which may exceed that which is required. Most of this work has focused on attempting to maximize strength of the catalyst without due regard for the negative impact of high levels of strengthener, e.g. silica, on activity and selectivity. Further, tests for catalyst strength have been carried out ex-situ, i.e. outside the SBCRs. Many of the tests have been conducted in a stirred tank reactor (autoclave) which subjects the catalyst to severe shearing forces not typically encountered in slurry bubble column reactors.

Improved catalyst strength can be achieved by depositing the iron on a refractory support such as silica, alumina or magnesia or by adding a structural promoter to the baseline catalyst. The challenge is to strengthen the catalyst without appreciably compromising the activity and selectivity of the catalyst. Use of binders, for example, $SiO_2$ binder, has been performed at high levels, e.g. 10%-15%. These catalysts seem to yield very light products. Silica ($SiO_2$) and alumina ($Al_2O_3$) as supports at high levels (~10%) are known.

Attrition of a precipitated iron catalyst promoted with copper and potassium was studied by United Catalyst (now Sud-Chemie). It was reported that the low agglomerate strength of this catalyst led to attrition on the micron scale caused by physical action on the catalyst. Phase transformations and carbon deposition that accompanied exposure of the catalyst to carbon monoxide at elevated temperatures were found to cause break-up of the catalyst particles into nano-scale carbide particles.

Accordingly, there is a need for a catalyst and a method of making same which has improved resistance against breakdown and also maintains the salient features of an unsupported iron catalyst, viz. high activity and selectivity toward high molecular weight hydrocarbons. Such a catalyst should preferably also improve separation of the catalyst from the reaction mixture.

SUMMARY

Herein disclosed is a method of strengthening a precipitated unsupported iron catalyst by: providing a raw catalyst containing copper and potassium; adding a solution comprising a structural promoter to the catalyst; drying the mixture; and calcining the dried catalyst. Also disclosed is a strengthened catalyst prepared using the disclosed method. In embodiments, the structural promoter may comprise potassium silicate. The potassium silicate may be an aqueous solution.

In embodiments of the method of strengthening a precipitated unsupported iron catalyst, the weight percent of $SiO_2$ in the dried catalyst is from about 1% to about 2.2%. In some embodiments, the weight percent of copper in the catalyst is about 1%. In embodiments, the weight percent of potassium in the catalyst is about 1%.

In embodiments of the method of strengthening a precipitated unsupported iron catalyst, liquid structural promoter is added via incipient wetness technique. The particle size distribution of the strengthened catalyst may be the same as the precipitated unsupported catalyst.

Also disclosed herein is a method for preparing an iron catalyst, the method comprising: precipitating a catalyst precursor comprising at least one iron phase selected from iron hydroxides and iron carbonates; adding a promoter to the catalyst precursor to yield a promoted precursor; drying the promoted precursor to yield dried catalyst; and calcining the dried catalyst, wherein the catalyst further comprises copper and potassium. The method may further comprise adding potassium carbonate to the catalyst precursor in an amount sufficient to promote the catalyst with potassium. The catalyst precursor may further comprise copper oxide. The method may further comprise adding copper nitrate to the catalyst precursor. The promoter may comprise liquid potassium silicate structural promoter. The potassium silicate may be an aqueous solution.

The dried catalyst may comprise from about 1 wt % $SiO_2$ to about 2.2 wt % $SiO_2$. In embodiments, the dried catalyst comprises about 1% copper and about 1% potassium. In some embodiments, the structural promoter comprises TEOS.

In some embodiments of the method for preparing an iron catalyst, precipitating a catalyst precursor comprises precipitating iron hydroxide, iron carbonate, or a mixture thereof from a solution comprising TEOS or potassium silicate, and adding a promoter to the catalyst precursor to yield a promoted precursor comprises adding potassium carbonate. In some embodiments, the promoter comprises silica as structural promoter. The silica may be in a colloidal form. Alternatively, the silica may comprise silica sol.

In embodiments of the method for preparing an iron catalyst, the Fe:Cu mass ratio is between about 100:1 and 100:7. In specific embodiments, the Fe:Cu mass ratio is about 100:4. In embodiments of the method for preparing an iron catalyst, the Fe:K mass ratio is between about 100:1 and 100:5. In specific embodiments, the Fe:K mass ratio is about 100:3. In embodiments of the method for preparing an iron catalyst, the Fe:$SiO_2$ mass ratio is between about 100:1 and 100:8.

In specific embodiments, the Fe:$SiO_2$ mass ratio is about 100:5. The Fe:Cu:K:$SiO_2$ mass ratio may be about 100:4:3:5. In other embodiments, the Fe:Cu:K:$SiO_2$ mass ratio is about 100:3:3:5.

Also disclosed herein is a method of preparing a strengthened precipitated iron catalyst comprising: co-precipitating iron, copper, magnesium, and aluminum; washing the precipitate; alkalizing the precipitate; and drying the precipitate to yield a dried catalyst precursor.

The method of preparing a strengthened precipitated iron catalyst, may further comprise calcining the dried catalyst precursor; and treating the catalyst precursor with a gas comprising carbon monoxide, hydrogen, or a combination thereof. The ratio of magnesium atoms to aluminum atoms may be in the range of from about 0.4 to about 0.6. The catalyst may comprise $MgAl_2O_4$. In embodiments, the catalyst further comprises $SiO_2$. In embodiments, the catalyst comprises more than about 50 wt % oxides selected from oxides of iron, copper, aluminum, magnesium, silicon and combinations thereof.

The present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

Figure 1:
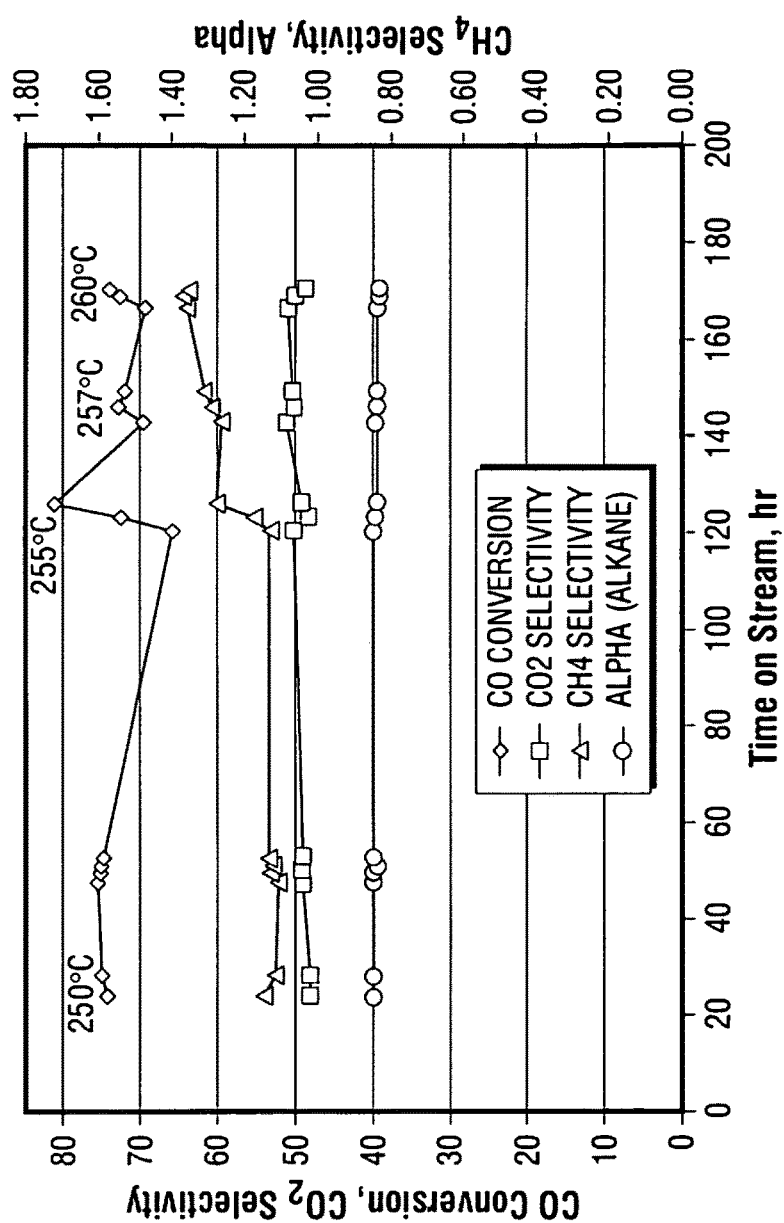
FIG. 1 is a plot of CO conversion, alpha (alkane), $CO_2$ selectivity, and $CH_4$ selectivity as a function of time on stream showing the catalytic performance of AR69 in a short-time test.

"Raw" catalyst refers to a formed, dry catalyst after calcination.

The Fischer-Tropsch synthesis can be described as a polymerization reaction in which methyl species act as initiators for chain growth. Anderson-Schultz-Flory (ASF) product distribution shows that a polymerization-like process effectively describes the product distribution of the Fischer-Tropsch synthesis. Each carbon number surface species has a probability of continuing the chain growth or terminating the polymerization to produce product. The product spectrum may be characterized by the parameter, alpha, which is the chain growth probability.

DETAILED DESCRIPTION

I. Overview

In an FT process, a hydrogen and carbon monoxide-containing gas stream is introduced into a Fischer-Tropsch reactor which preferably employs a catalyst slurry using an iron-based catalyst and more preferably a precipitated iron catalyst and most preferably a precipitated iron catalyst that is promoted with predetermined amounts of potassium and copper depending on the preselected probability of linear condensation polymerization and the molecular weight distribution sought.

It has been unexpectedly discovered that the addition of a structural promoter to a precipitated iron catalyst at a small percentage level significantly reduces the breakdown of the catalyst in a SBCR (slurry bubble column reactor). The amount of structural promoter is less than that used in the published art and does not substantially affect the activity and selectivity when compared with the structurally un-promoted catalyst, but enhances structural integrity during activation and operation. The mass ratio of $SiO_2$:Fe is less than about 1:100 when the structural promoter comprises silica and less than about 8:100 when the structural promoter comprises silica sol, as will be described in more detail hereinbelow.

It has also been unexpectedly discovered, that an iron catalyst precursor prepared by co-precipitation of copper, silicon, magnesium, and aluminum with iron provides an FT catalyst that exhibits high activity, selectivity, and stability.

There are three fundamental aspects to producing a catalyst for a particular application: composition, method of preparation, and procedure for activating the catalyst. Each of these aspects will be described for the improved catalyst (IC) herein disclosed.

II. Structural Promoter (Binder)

The improved catalyst of the present disclosure comprises at least one structural promoter. In embodiments, the at least one structural promoter is selected from oxides of metals and metalloids and combinations thereof. The structural promoter may be referred to as a binder, a support material, or a structural support. In embodiments, the structural promoter is incorporated into the improved catalyst (IC) by coprecipitation. In embodiments, the structural promoter is added to a conventional precipitated catalyst subsequent precipitation of the conventional precipitate comprising iron hydroxides or iron carbonates. In embodiments, structural promoter is coprecipitated with the catalyst material, and additional structural promoter (e.g. binder) is added following the precipitation of the catalyst material.

A. Adding Silicate Structural Promoter to Conventional Precipitated Unsupported Catalyst In embodiments structural promoter comprising silica or silicate is added to a precipitate of a conventional precipitated unsupported catalyst, the precipitate comprising iron phases. The iron phases may be selected from iron hydroxides, iron carbonates, iron oxides, and combinations thereof. The precipitated unsupported catalyst that may be improved via embodiments of the present invention may comprise any suitable iron FT catalyst known to those of skill in the art. Preferably, iron based catalysts described in U.S. Pat. No. 5,504,118 and U.S. Provisional Patent No. 60/955,142 are utilized due to their low cost.

In embodiments, structural promoter comprises potassium silicate aqueous solution, which will be referred to herein as liquid potassium silicate. As mentioned hereinabove, the precipitated unsupported catalyst that may be improved via embodiments of the present invention may comprise any suitable iron F-T catalyst known to those of skill in the art.

In embodiments, the structural promoter is a liquid. In embodiments, the structural promoter comprises potassium silicate aqueous solution. In embodiments, the liquid structural promoter comprises tetraethyl ortho silicate, TEOS, or potassium silicate and is added such that the catalyst has a silica content of from about 1 wt. % to about 2.2 wt. %. In embodiments, liquid promoter is added to a precipitated unstrengthened catalyst (baseline catalyst) via incipient impregnation as known to those of skill in the art. Suitable incipient impregnation technique is described hereinbelow.

Incipient wetness impregnation is a commonly used technique for the synthesis of heterogeneous catalysts. Active metal/metalloid precursor is typically dissolved in an aqueous or organic solution. The metal/metalloid-containing solution is then added to a catalyst containing the same pore volume as the volume of solution that was added. Capillary action draws the solution into the pores. The catalyst can then be dried and calcined to drive off the volatile components within the solution, depositing the metal/metalloid on the catalyst surface.

Examples 1A to 1G hereinbelow describe ICs prepared according to embodiments of this disclosure, by the addition of structural promoter comprising liquid potassium silicate. The ICs of Examples 1A to 1G are formed via incipient wetness impregnation with liquid potassium silicate.

In embodiments, the raw promoted precipitated unsupported catalyst to which liquid promoter is added via the present disclosure is useful in a slurry Fischer-Tropsch reactor. Suitable promoted precipitated unstrengthened iron catalyst is described in U.S. Pat. No. 5,504,118 and U.S. Provisional Patent No. 60/955,142.

Preparation of precipitated unstrengthened catalyst may comprise: dissolving (E.G. at less than 150° F.) predetermined quantities of iron (and optionally copper and/or other metal(s)) in nitric acid to form a solution of ferrous nitrate, ferric nitrate (and cupric nitrate and/or other nitrates); sparging the solution with oxygen-containing gas during the step of dissolving; precipitating a catalyst precursor comprising metal oxides by the addition of sufficient base (e.g. ammonium hydroxide or sodium carbonate) to the solution formed; removing the ammonium nitrate or sodium nitrate solution formed during the precipitation step; washing the catalyst precursor; adding while mixing a water slurry containing potassium carbonate to the catalyst precursor in an amount sufficient to promote the catalyst with potassium. The metal oxide comprises iron oxide selected from the group consisting of hydrous iron oxides and precipitated iron oxide, and may comprise oxides of copper, and other metal oxides. If copper is not precipitated with iron, the copper may be added following precipitation, as copper nitrate solution, as described in Example 21 hereinbelow.

A spray dryer may be used to remove most of the water from the precipitated unsupported catalyst and at the same time to produce roughly spherical precipitated unsupported catalyst particles having diameters in the range of 40 to 100 microns, prior to the addition of structural promoter comprising silicate via incipient wetness technique.

The unstrengthened catalyst may be heated in air (for example, to about 600° F.) to remove residual moisture and to stabilize the precipitated unsupported catalyst. In embodiments, this step is carried out in a fluidized bed which is heated electrically. In embodiments, silicate structural binder is then added to the calcined precipitated unsupported catalyst.

Most preferably, a precipitated iron catalyst is employed and depending on the level of structural promoter comprising silicate and the preselected alpha, i.e. the polymerization probability desired, the weight ratio of K:Fe is from about 0.5:100 to about 6.5:100. More preferably, the weight ratio of K:Fe is from about 0.5:100 to about 2:100. In some embodiments, the weight ratio of K:Fe is about 1:100.

The weight ratio of copper to iron is preferably between about 0.005 and 0.050, more preferably between about 0.0075 and 0.0125, and most preferably about 0.010. Copper may serve as a reduction promoter. In preferred embodiments, the weight ratio of Cu:Fe is about 1:100.

According to this embodiment of this disclosure, structural promoter comprising silicate is added to a precipitated unsupported catalyst and the resulting improved catalyst (or "IC") is then dried. Drying may be via spray drying as known to those of skill in the art. The dried IC may further be calcined to increase attrition resistance. For example, a precipitated unsupported catalyst according to U.S. Pat. No. 5,504,118 and U.S. Provisional Patent No. 60/955,142 may be enhanced via the disclosed method via the addition of silicate binder.

It is understood that the herein disclosed method is useful for improving iron FT catalysts other than and including the precipitated unsupported catalyst described according to U.S. Pat. No. 5,504,118 and U.S. Provisional Patent No. 60/955,142 and described herein. For example, the disclosed method may be used to enhance a precipitated unsupported catalyst containing structural promoter other than that presently disclosed. (That is, the use of the term 'precipitated unsupported catalyst' is not meant to limit the prior art catalysts which may be enhanced by the disclosed method to conventional catalysts comprising no structural promoter.)

Upon addition of liquid structural promoter to a precipitated unsupported catalyst, drying of the promoted IC may be achieved by any means known to one of skill in the art. For example, drying may be achieved by spray drying, microwave energy, pan drying in an oven, or any other appropriate means. In embodiments, the drying exposes the IC to a maximum temperature in the range of from about 100° C. to about 200° C.

Following drying, the IC may be calcined. In embodiments, calcination is carried out at a temperature in the range of from about 250° C. to about 450° C. In some embodiments, calcination is carried out at a temperature in the range of from about 300° C. to about 400° C. In some embodiments, calcination is performed at a temperature of about 350° C.

In embodiments, the particle size distribution (PSD) of the IC formed via addition of binder to a raw prepared precipitated unsupported catalyst is substantially the same as the PSD of the raw precipitated unsupported catalyst.

In embodiments, a precipitated iron catalyst is improved by adding a structural promoter to the catalyst slurry. In embodiments, the silicon-containing binder comprises potassium silicate, colloidal silica, TEOS, or a combination thereof. Without wishing to be limited by theory, adding the binder to the slurry may improve dispersion of the metals in the catalyst and/or minimize damage to particles by the addition of silica via incipient wetness method at a later stage.

For example, in embodiments, the IC is formed by: dissolving (e.g. at less than 150° F.) predetermined quantities of iron and optionally copper in nitric acid to form a solution of ferrous nitrate, ferric nitrate and, in embodiments, cupric nitrate; sparging the solution with oxygen-containing gas during the step of dissolving; precipitating a catalyst precursor by the addition of sufficient base (e.g., ammonium hydroxide or sodium carbonate) to the solution formed; removing the ammonium nitrate and sodium nitrate formed during the precipitation step; washing the catalyst precursor; admixing a water slurry containing potassium carbonate to the catalyst precursor in an amount sufficient to promote the catalyst with potassium, and adding a structural promoter to the catalyst precursor to yield a promoted mixture. If copper is not precipitated with iron, the copper may be added following precipitation, as copper nitrate solution, as described in Example 2I hereinbelow. The promoted mixture may then be dried as described above.

In embodiments, the precipitating agent (base) is selected from $NH_4OH$, $(NH_4)_2CO_3$, $NH_4HCO_3$, $NaOH$, $Na_2CO_3$, $NaHCO_3$, $KOH$, $K_2CO_3$, $KHCO_3$, and combinations thereof.

B. Simultaneous Addition of Silica Sol and Potassium to Precipitate Comprising Iron, Iron Hydroxide, Iron Oxide, and/or Iron Carbonate In embodiments, the potassium carbonate and structural promoter are added simultaneously. In embodiments, the structural promoter comprises silica in colloidal form. In embodiments, the silica is silica sol.

In some embodiments, the at least one structural promoter comprises silica and the liquid structural promoter is added to the catalyst precursor (precipitated catalyst material) following the addition of potassium carbonate promoter. Examples 2A-21 hereinbelow describe ICs formed by the addition of liquid structural promoter comprising silica sol to a precipitated catalyst precursor.

In some embodiments, the silica sol comprises TMA LUDOX, LUDOX, LUDOX AS-30 or polysilicic acid (available from Sigma Aldrich, St. Louis, Mo.). Examples 2A, 2B and 2C hereinbelow describe improved catalysts according to this invention wherein the structural promoter comprises LUDOX. Examples, 2D and 2E describe the formation of inventive catalysts wherein the structural promoter comprises TMA LUDOX (TMA is tetramethyl ammonium). Examples 2F and 2H hereinbelow describe preparation of inventive catalysts wherein the structural promoter comprises polysilicic acid. Examples 2G and 2I hereinbelow describe inventive catalyst wherein the structural promoter comprises LUDOX AS-30. Examples 2J and 2K describe short and long term testing, respectively, of the liquid hydrocarbon production of the improved iron catalysts formed with silica sol structural promoter.

In some embodiments wherein the structural promoter comprises silica sol, the weight ratio of iron to potassium is in the range of from about 100:1 to about 100:5. In some embodiments, the weight ratio of iron to potassium is in the range of from about 100:2 to about 100:6. In more preferred embodiments, the weight ratio of iron to potassium is in the range of from about 100:3 to about 100:5. In some embodiments, the weight ratio of iron to potassium is in the range of from about 100:4 to about 100:5. In some preferred embodiments, the weight ratio of iron to potassium is in the range of from about 100:2 to about 100:4. In some specific embodiments, the weight ratio of iron to potassium about 100:3. In other certain embodiments, the weight ratio of iron to potassium about 100:5.

In some embodiments wherein the structural promoter comprises silica sol, the weight ratio of iron to copper is in the range of from about 100:1 to about 100:7. In some embodiments, the weight ratio of iron to copper is in the range of from about 100:1 to about 100:5. More preferably, the weight ratio of iron to copper is in the range of from about 100:2 to about 100:6. Still more preferably, the weight ratio of iron to copper is in the range of from about 100:3 to about 100:5. In some preferred embodiments, the weight ratio of iron to copper in the range of from about 100:2 to about 100:4. In other specific embodiments, the weight ratio of iron to copper about 100:5. In yet other specific embodiments, the weight ratio of iron to copper about 100:3.

Broadly, in embodiments, wherein the structural promoter is silica sol, the iron to $SiO_2$ weight ratio may be in the range of from about 100:1 to about 100:8; alternatively, in the range of from 100:1 to 100:7. More preferably, in some embodiments, wherein the structural promoter is silica, the iron to $SiO_2$ weight ratio may be in the range of from about 100:2 to about 100:6. Still more preferably, the weight ratio of iron to silica is in the range of from about 100:3 to about 100:5. In some preferred embodiments, wherein the structural promoter is silica, the iron to $SiO_2$ weight ratio is about 100:5. In embodiments, wherein the structural promoter is silica, the iron to $SiO_2$ weight ratio may be in the range of from about 100:3 to about 100:7; alternatively, in the range of from about 100:4 to about 100:6.

In some preferred embodiments, as described in Examples 2A, 2B, and 2E-21 hereinbelow, the Fe:Cu:K:$SiO_2$ mass ratio is about 100:4:3:5.

II. Co-Precipitation/Addition of Support Material

In embodiments, an IC is formed by co-precipitation of at least one structural promoter with the iron of the iron catalyst. In embodiments, the IC comprises more than about 50 wt % of oxides including iron oxides and other oxides. In embodiments, the metal of the mixed oxides is selected from silicon, magnesium, aluminum, copper, iron, and combinations thereof. In embodiments, the IC comprises up to 50 wt % oxides selected from oxides of copper, magnesium, silicon, aluminum and combinations thereof.

In embodiments, the IC is formed by copreciptiation with magnesium. In embodiments, magnesium is coprecipitated from magnesium nitrate. In some embodiments, the IC is formed by coprecipitation with copper. In embodiments, the IC is formed by coprecipitation with aluminum. In some embodiments, the IC is formed by coprecipitation from aluminum nitrate. In embodiments, the IC is formed by coprecipitation of iron with magnesium, silica, aluminum, copper, or a combination thereof. Example 3 hereinbelow describes ICs comprising oxides of magnesium, copper, and aluminum in addition to iron oxides, and formed by coprecipitation of iron with magnesium, copper, and aluminum from nitrate solutions thereof.

In certain embodiments, the structural promoter comprises tetraethyl orthosilicate, TEOS. For example, Example 4 hereinbelow describes an IC comprising $SiO_2$ and formed by coprecipitation of the catalyst from a solution comprising TEOS structural promoter.

As mentioned hereinabove, in embodiments, iron catalyst is improved by adding a support material during catalyst formation. In embodiments, a magnesium-containing compound serves as support material. In embodiments, the magnesium-containing compound comprises magnesium aluminate (spinel) $MgAl_2O_4$. In embodiments, the catalyst comprises at least one other support material selected from $SiO_2$, $TiO_2$, $Al_2O_3$, and combinations thereof. Magnesium may also serve as a promoter. In embodiments, the IC comprises $SiO_2$ and/or $Al_2O_3$ in addition to magnesium oxide (magnesia). $SiO_2$ and/or $Al_2O_3$ may add to the attrition resistance of an IC comprising magnesium. In embodiments, the support material provides structural support, increased surface area, chain growth promotion or a combination thereof.

In embodiments, IC is formed by coprecipitation of iron, copper, magnesium and aluminum. In embodiments, the ratio of magnesium to aluminum atoms in the IC and/or in the pre-precipitation mixture is in the range of from about 0.4 to about 0.6. In embodiments, the ratio of magnesium to aluminum is about 0.5. In embodiments, co-precipitation is performed by dissolution of the metals in nitric acid as described in U.S. Pat. No. 5,504,118 and hereinbelow.

Following co-precipitation, the precipitate may be washed as known to one of skill in the art. In embodiments, the precipitate is washed with high quality water which is essentially free of chlorine. Following washing, the washed precipitate may be alkalized by, for example, the addition of potassium carbonate. In embodiments, alkalization is performed prior to spray drying in order to adjust the Fe:K ratio to the desired value. In embodiments, alkalization is performed prior to spray drying in order to provide the desired Fe:K ratio.

The precipitated IC may subsequently be dried as discussed hereinabove. Production of the IC may further comprise calcining the dried IC. Calcination may be carried out at a temperature in the range of from about 250° C. to about 450° C. In some embodiments, calcination is performed at a temperature in the range of from about 350° C. to about 400° C. In specific embodiments, calcination occurs at a temperature of about 350° C.

It is also envisaged that a prepared IC formed via co-precipitation from mixed metal nitrates as described herein may be further enhanced by incorporating silica as described in Section II hereinabove. In embodiments, structural promoter (potassium silicate or TEOS; about 1 wt % to 3 wt %) may be added as described in Section IIA hereinabove to precipitate comprising mixed oxides. In other embodiments, precipitation of the mixed metal oxides of the IC may occur in the presence of TEOS.

Example 5 hereinbelow describes IC comprising oxides of silica, magnesium, aluminum, and copper, as well as iron oxides. The IC of Example 5, RSC-BD-48, is formed by coprecipitation of iron, copper, magnesium, and aluminum in the presence of TEOS. Example 10 hereinbelow describes the enhanced attrition resistance of RSC-BD-48.

III. Catalyst Activation

In some embodiments, the IC is activated prior to use in an FT process. In certain embodiments, the IC is activated in situ. Many different activating procedures for promoted iron Fischer-Tropsch catalysts have been described in the literature. High activity of the catalyst has previously been correlated with the presence of iron carbides after the activation procedure. Effective procedures include the use of carbon monoxide at 325° C. at 0.1 atm pressure. The presence of copper and potassium in the catalyst may affect activation of the catalyst.

In embodiments, the IC is activated by any means known to one of skill in the art. In embodiments, the IC is pre-treated in hydrogen. In embodiments, the IC is pre-treated with a gas comprising carbon monoxide. In embodiments, the IC is pre-treated in synthesis gas. In embodiments, pre-treatment occurs at preselected conditions of temperature and pressure. In embodiments, these pre-selected conditions of temperature encompass a temperature of from about 250° C. to about 300° C. In embodiments, these pre-selected conditions of pressure encompass a pressure of from about 5 atm. to about 10 atm.

In embodiments, as described in U.S. Pat. No. 5,504,118, the activity and selectivity of the IC is improved by subjecting the IC to a hydrogen-rich synthesis gas at elevated temperature and pressure. The reaction of carbiding of the iron catalyst precursor using a hydrogen-rich synthesis gas and the subsequent Fischer-Tropsch reaction both produce water. Without wishing to be limited by theory, it is believed that the presence of this water prevents over-carburization of the catalyst and thereby improves the activity and selectivity of the catalyst.

In embodiments, hydrogen-rich synthesis gas is used in lieu of an inert gas for maintaining the IC in suspension while the slurry is being heated to approximately 200° C. At this point, the synthesis gas is replaced by an inert gas (nitrogen or carbon dioxide) until the activation temperature has been attained at which time activation is carried out using synthesis gas.

It has been reported in U.S. Pat. No. 5,504,118 that the presence of a large amount (20%) by volume of nitrogen in the synthesis gas used for pretreatment of a precipitated unsupported catalyst had no detrimental effect on the activation procedure. In embodiments, activation of the IC occurs in the presence of about 20% nitrogen.

In embodiments, the initial load of IC in a commercial-scale slurry reactor comprising several thousand pounds of catalyst is pretreated in the full-scale slurry reactor. During operation, however, when only a few hundred pounds of catalyst need to be pretreated to replace a portion of the inventory in the reactor to maintain activity, a separate pretreatment reactor may be desirable. The pretreatment reactor may be similar in design to the large Fischer-Tropsch reactor, but much smaller. The batch of slurry containing the pretreated catalyst is pumped into the large reactor as known to those of skill in the art.

In some embodiments, small amounts of IC, i.e. up to 10% by weight of the total amount of catalyst in the F-T reactor, are activated in situ by adding raw catalyst directly to the reactor at operating conditions.

In embodiments, the IC is activated by contacting the catalyst with a mixture of gaseous hydrogen and carbon monoxide at a temperature of from about 250° C. to 300° C., for about 0.5 to 5 hours, with a water vapor partial pressure of about 1 psia, and a hydrogen to carbon monoxide mol (or volume) ratio of about 1.3 to 1.5, the activation being effective to increase the selectivity of the activated IC in the subsequent formation of liquid hydrocarbons in a Fischer-Tropsch reaction. In embodiments, the syngas for activation has a $H_2$:CO mol ratio of about 1.4. In embodiments, activation in syngas occurs for a time period up to 6 hours. In embodiments, the catalyst in wax or oil is first heated to 275° C. in $H_2$ and then syngas is fed for activation.

For example, the improved catalyst of this disclosure may be activated using a "typhoon" activation method. According to this method, in situ catalyst activation is performed by heating the catalyst to 275° C. in nitrogen, feeding syngas at a $H_2$:CO ratio of 1.4 once attaining a temperature of 275° C., activating at 275° C. under 140 psig pressure for 4-24 hours (depending on the space velocity).

Suitable activation procedures for inventive catalyst according to this disclosure are provided in Examples 2J, 2K and 7 hereinbelow.

In some embodiments, IC comprising support material (e.g. $MgAl_2O_4$, $MgAl_2O_4$—$SiO_2$, $Al_2O_3$, $SiO_2$, $SiO_2$—$Al_2O_3$, etc.) in oil or wax is first heated to 200° C. in $N_2$, and then syngas is fed, and the temperature is ramped to a temperature in the range of about 285° C. to 300° C. In embodiments, the syngas used for activation has a $H_2$:CO ratio of about 0.7. In embodiments, the temperature is ramped from 200° C. to a temperature of from about 285° C. to about 300° C. at a ramp rate in the range of from 1° C./min to about 5° C./min.

In some embodiments, IC catalysts are activated with 100% CO.

IV. Properties of Improved Catalyst
Activity, Selectivity, CO Conversion, Yield and Alpha In embodiments, the methods of producing iron-based catalysts yield catalysts for which the structural integrity of the catalyst is enhanced while maintaining substantial catalytic activity. It has been found (see Examples hereinbelow), that at concentrations of structural promoter less than conventionally utilized, substantial catalyst activity is maintained. Example 2K hereinbelow describes long term testing of inventive catalyst and the rate of overall activity decline (ROAD) (i.e., the deactivation rate) of the catalysts. In embodiments, the FT activity of the improved catalyst is at least 10% greater than the activity of previously reported attrition resistant catalysts.

In embodiments, the selectivity of the IC (as compared to baseline precipitated unsupported catalyst) is not substantially changed by the improvement. In embodiments, for example, the $CO_2$ and $CH_4$ selectivities of the IC are not negatively altered when compared to the unstrengthened precipitated unsupported catalyst, as shown for catalysts formed with silica sol structural promoter in Examples 2J and 2K hereinbelow.

In embodiments, the methane selectivity of the improved catalyst of this disclosure is less than about 4%. In some embodiments, the methane selectivity of the improved catalyst of this disclosure is less than about 3%. In some embodiments, the methane selectivity of the improved catalyst of this disclosure is less than about 2%. In some preferred embodiments, the methane selectivity of the improved catalyst of this disclosure is less than about 1%.

In embodiments, the liquid yield from IC is not substantially reduced from the liquid yield obtained with baseline precipitated unsupported catalyst. In embodiments, the CO conversion is maintained or increased by the use of liquid structural promoter as disclosed herein. In embodiments, the IC of the present disclosure produces a high alpha catalyst having chain-growth characteristics substantially similar to the chain growth characteristics of the precipitated unsupported catalyst. Examples 2J and 2K describe short and long term testing of inventive catalysts, including CO conversion, alpha, and the amount of fines produced therefrom.

Separation Efficiency and Fines Production

One of the characteristics of a slurry Fischer-Tropsch reactor designed to produce heavier hydrocarbon products is the continuous increase in slurry height due to the low volatility of the heavier waxes. In embodiments, during FT operation, catalyst is separated from reaction product via a separation unit from which a wax filtrate is obtained. One method to maintain the slurry level to a constant value is to use a cross-flow filter to remove filtered wax while returning the catalyst to the reactor.

Spray-dried precipitated iron oxide particles typically comprise clusters of many nanometer size particles which can break from the cluster due to stresses of chemical transformations during activation or due to mechanical stresses encountered in the slurry bubble column reactor. These particles can be deleterious to the action of the separation unit, and mandate the use of multiple separation units for removal of catalyst from the reaction product. Activated FT catalyst (for example, pretreated in CO and exposed to syngas for a time) typically comprises a core comprising $Fe_3O_4$ and an active iron carbide ($Fe_xC$, e.g. $Fe_{2.2}C$ and/or $Fe_{2.5}C$) outer shell around the $Fe_3O_4$ core. Carbon may be formed during the synthesis, separate from the cluster, and hinder the performance of the separation unit(s).

In embodiments, the separation unit comprises a metal filter, a cross-flow filter (e.g. a Mott filter), a dynamic settler, or a combination thereof. For example, the separation unit may comprise a "dynamic settler" as disclosed in U.S. Pat. Nos. 6,068,760; 6,730,221; and 6,712,982 to Rentech. In embodiments, the content of catalyst in the wax filtrate is significantly less when using IC than the content of catalyst in the wax filtrate typically obtained when using conventional precipitated unsupported catalyst (~1000 ppm). Typically, with a baseline precipitated unsupported catalyst, further filtration is required to reduce the catalyst content of the wax filtrate to the range required for subsequent processes, e.g. to reduce the catalyst content in the wax to the 10 ppm range for subsequent hydrocracking. In embodiments, the catalyst of the present disclosure may eliminate the need for further filtration by virtue of the improved structural integrity/ease of separation of the IC from the reaction product (e.g. wax product).

In embodiments, the improved catalyst of this disclosure produces a smaller quantity of fines than precipitated unsupported catalysts during catalyst activation and/or FT reaction. As described in Example 9 hereinbelow, a chemical attrition index based on 10 micrometer sized particles, CAI-10, was defined as the difference in the percentage of particles having a size greater than 10 μm before and after activation divided by the percentage of particles having a size greater than 10 μm after activation. Similarly, a chemical attrition index based on 20 micrometer sized particles, CAI-20, was defined as the difference in the percentage of particles having a size greater than 20 μm before and after activation divided by the percentage of particles having a size greater than 20 μm after activation. In embodiments, the CAI-10 of the IC is reduced by a factor of greater than about 10 relative to the CAI-10 of an unsupported catalyst. In embodiments, the CAI-10 is reduced by a factor of greater than about 15. In embodiments, the CAI-10 is reduced by a factor of greater than about 20. In embodiments, the CAI-20 of an IC according to this disclosure is reduced by a factor of greater than about 7 relative to unsupported iron catalyst. In embodiments, the CAI-20 is reduced by a factor of greater than about 10. In embodiments, the CAI-20 is reduced by a factor of greater than about 20. In embodiments, the CAI-20 is reduced by a factor of greater than about 30.

Examples 2J and 2K describe short and long term testing of inventive catalysts, and the amount of fines produced therefrom. Example 6 hereinbelow describes a settling test of a silica-containing IC of the present disclosure. Example 9 hereinbelow describes the separation of ICs from hydrocarbon product mixtures. Example 7 hereinbelow describes autoclave and SBCR test results of IC catalyst formed with potassium silicate structural promoter. Example 8 hereinbelow describes the results of attrition tests and the resulting particle size distributions for several of the silica-containing ICs formed with potassium silicate structural promoter.

EXAMPLES

Example 1

Potassium Silicate Binder Added to Conventional Precipitated Unsupported Catalyst A raw unsupported precipitated iron catalyst promoted with copper and potassium was prepared according to the description in U.S. Pat. No. 5,504,118 and U.S. Provisional Patent No. 60/955,142. The raw catalyst was made using elemental iron and copper as starting materials.

The first step in the preparation of the raw catalyst was dissolution of the metals in nitric acid to form a mixture of ferrous nitrate, ferric nitrate and cupric nitrate in appropriate proportions. The ratio of water to acid in an important parameter and may be adjusted to give a weight ratio of about 6:1. The dissolution of the metals in nitric acid is accompanied by evolution of nitrogen oxides, principally nitric oxide and nitrogen dioxide. Nitric oxide has limited solubility in the acid, but it can be readily oxidized to nitrogen dioxide by contact with air or oxygen. Nitrogen dioxide dissolves in water producing nitric acid and nitric oxide. Therefore, in order to reduce nitrogen oxide emissions from the reaction vessel and at the same time to reduce the consumption of nitric acid, oxygen may be bubbled through the solution while the metals are being dissolved. The small amount of nitrogen dioxide which escapes from the vessel is scrubbed using a potassium hydroxide solution. The mixture was stirred until all of the metals dissolved. The temperature of the solution increased as the metals dissolved, but was controlled to a maximum temperature of about 70° C.

The next step in the process was precipitation of a catalyst precursor from the nitrate solution using ammonium hydroxide. Ammonium hydroxide was prepared by dissolving anhydrous ammonia in water. Ammonium hydroxide at ambient temperature was added to the hot nitrate solution until the pH of the solution reached about 7.4. At this point, all of the metals had precipitated out as oxides. The mixture was cooled to about 80° F. and the final pH was adjusted to about 7.2.

After precipitation, the catalyst precursor was washed free of ammonium nitrate using high quality water which is preferably free of chlorine. The slurry may be pumped from the precipitation vessel into a holding tank located upstream of a vacuum drum filter. The catalyst precursor may be allowed to settle in the holding tank and a clear layer of concentrated ammonium nitrate solution may form above the solids. This layer may be drawn off before the slurry is washed and filtered. A vacuum drum filter fitted with water spray bars may be used for washing the catalyst precursor and concentrating the slurry. The electrical conductivity of the filtrate may be monitored to ensure complete removal of ammonium nitrate from the slurry.

After the catalyst precursor was washed, the last ingredient of the catalyst, potassium carbonate, was added in an amount appropriate for the quantity of iron contained in the batch. Potassium is a promoter for chain growth and may also maintain the catalyst in iron carbide form. Adding more than appropriate amount of potassium may cause formation of more oxygenated products which may oxidize the catalyst. Potassium carbonate was added to the slurry after washing was completed and prior to spray drying. The potassium carbonate was dissolved in a small amount of water and this solution was mixed thoroughly into the slurry to distribute the potassium uniformly. In embodiments, the weight percent of solid catalyst material in the slurry at this point is a value of between about 8 to about 12.

Examples 1A to 1G contain detailed descriptions of the manufacturing process for inventive catalysts with different structural promoters. ICs were prepared comprising $SiO_2$ concentrations of 1.0 wt %, 1.5 wt %, 1.6 wt %, 2.0 wt %, 2.2 wt %, and 10 wt %, corresponding to IC catalysts RSC-BD-31, RSC-BD-33, RSC-BD-30, RSC-BD-32, RSC-BD-18, and RSC-BD-22 respectively. The method according to U.S. Pat. No. 5,504,118, which is hereby incorporated herein for all purposes, and described above, was used to form catalyst precipitation solution of a raw precipitated unsupported catalyst, to which various amounts of aqueous potassium silicate ($K_2SiO_2$) were subsequently added.

Example 1A

Preparation of RSC-BD-18:
Fe/Cu/K/$SiO_2$:100/1/2.09/3.3 by wt.

In step (1), 5.6 g of potassium silicate ($SiO_2$/$K_2O$=2.5 by wt, 20.8% $SiO_2$ and 8.3% $K_2O$) was diluted with 7.1 g of DI water.

In step (2), 50.0 g of precipitated iron catalyst prepared using the method of U.S. Pat. No. 5,504,118 and U.S. Provisional Patent No. 60/955,142, was impregnated by mixing thoroughly with 12.7 g of aqueous solution of potassium silicate prepared in step 1.

In step (3), the material obtained in step 2 was first heated to 125° C. at the rate of 2° C./min, and held at this temperature for 12 h, and then ramped to 350° C. at the rate of 1l/min, and calcined at this temperature for 16 h. (It is noted that this catalyst could also have been prepared by adding potassium silicate to precipitate prior to spray drying.) In step 2, the catalyst was spray dried and calcined prior to the addition of solution from (1).

Example 1B

Preparation of RSC-BD-19:
Fe/Cu/K/SiO$_2$:100/1/3.55/6.69 by wt.

In step (1), 8.8 g of potassium silicate (SiO$_2$/K$_2$O=2.1 by wt, 26.5% SiO$_2$ and 12.2% K$_2$O) was diluted with 3.9 g of DI water.

In step (2), 50.0 g of precipitated iron catalyst prepared as described in U.S. Pat. No. 5,504,118 and U.S. Provisional Patent No. 60/955,142 was impregnated by mixing thoroughly with 12.7 g of aqueous solution of potassium silicate prepared in step 1.

In step (3), the material obtained in step 2 was first heated to 125° C. at the rate of 2° C./min, and held at this temperature for 12 h, and then ramped to 350° C. at the rate of 1°/min, and calcined at this temperature for 16 h. (It is noted that this catalyst could also have been prepared by adding potassium silicate to the precipitate prior to spray drying.)

Example 1C

Preparation of RSC-BD-22:
Fe/Cu/K/SiO$_2$:100/1/6.51/16.62 by wt.

In step (1), 28.0 g of potassium silicate (SiO$_2$/K$_2$O=2.5 by wt, 20.8% SiO$_2$ and 8.3% K$_2$O) was diluted with 11.0 g of DI water.

In step (2), 50.0 g of precipitated iron catalyst prepared as described in U.S. Pat. No. 5,504,118 and U.S. Provisional Patent No. 60/955,142 was impregnated by mixing thoroughly with 39.0 g of aqueous solution of potassium silicate prepared in step 1. Incipient wetness impregnation was repeated three times using 13 g of aqueous solution of potassium silicate, and the material was dried in an oven for about 4 h each time after each impregnation.

In step (3), the material obtained in step 2 was first heated to 125° C. at the rate of 2° C./min, and held at this temperature for 12 h, and then ramped to 350° C. at the rate of 1l/min, and calcined at this temperature for 16 h. (It is noted that this catalyst could also have been prepared by adding potassium silicate to the precipitate prior to spray drying.)

Example 1D

Preparation of RSC-BD-30:
Fe/Cu/K/SiO$_2$:100/1/1.78/2.34 by wt.

In step (1), 3.9 g of potassium silicate (SiO$_2$/K$_2$O=2.5 by wt, 20.8% SiO$_2$ and 8.3% K$_2$O) was diluted with 8.0 g of DI water.

In step (2), 50.0 g of precipitated iron catalyst prepared as described in U.S. Pat. No. 5,504,118 and U.S. Provisional Patent No. 60/955,142 was impregnated by mixing thoroughly with 11.9 g of aqueous solution of potassium silicate prepared in step 1.

In step (3), the material obtained in step 2 was first heated to 125° C. at the rate of 2° C./min, and held at this temperature for 6 h, and then ramped to 350° C. at the rate of 2°/min, and calcined at this temperature for 16 h. (It is noted that this catalyst could also have been prepared by adding potassium silicate to the precipitate prior to spray drying.)

Example 1E

Preparation of RSC-BD-31:
Fe/Cu/K/SiO$_2$:100/1/1.48/1.45 by wt.

In step (1), 2.4 g of potassium silicate (SiO$_2$K$_2$O=2.5 by wt, 20.8% SiO$_2$ and 8.3% K$_2$O) was diluted with 12.6 g of DI water.

In step (2), 50.0 g of precipitated iron catalyst prepared as described in U.S. Pat. No. 5,504,118 and U.S. Provisional Patent No. 60/955,142 was impregnated by mixing thoroughly with 12.6 g of aqueous solution of potassium silicate prepared in step 1.

In step (3), the material obtained in step 2 was first heated to 125° C. at the rate of 2° C./min, and held at this temperature for 12 h, and then ramped to 350° C. at the rate of 2°/min, and calcined at this temperature for 16 h. (It is noted that this catalyst could also have been prepared by adding potassium silicate to the precipitate prior to spray drying.)

Example 1F

Preparation of RSC-BD-32:
Fe/Cu/K/SiO$_2$:100/1/1.97/2.95 by wt.

In step (1), 12.9 g of potassium silicate (SiO$_2$/K$_2$O=2.5 by wt, 20.8% SiO$_2$ and 8.3% K$_2$O) was diluted with 19.6 g of DI water.

In step (2), 130.0 g of precipitated iron catalyst prepared as described in U.S. Pat. No. 5,504,118 and U.S. Provisional Patent No. 60/955,142 was impregnated by mixing thoroughly with 32.5 g of aqueous solution of potassium silicate prepared in step 1.

In step (3), the material obtained in step 2 was first heated to 125° C. at the rate of 2° C./min, and held at this temperature for 12 h, and then the temperature was ramped to 350° C. at the rate of 2°/min, and the material calcined at this temperature for 16 h. (It is noted that this catalyst could also have been prepared by adding potassium silicate to the precipitate prior to spray drying.)

Example 1G

Preparation of RSC-BD-33:
Fe/Cu/K/SiO$_2$:100/1/1.73/2.19 by wt.

In step (1), 9.6 g of potassium silicate (SiO$_2$/K$_2$O=2.5 by wt, 20.8% SiO$_2$ and 8.3% K$_2$O) was diluted with 22.9 g of DI water.

In step (2), 130.0 g of precipitated iron catalyst prepared as described in U.S. Pat. No. 5,504,118 and U.S. Provisional Patent No. 60/955,142 was impregnated by mixing thoroughly with 32.5 g of aqueous solution of potassium silicate prepared in step 1.

In step (3) the material obtained in step 2 was first heated to 125° C. at the rate of 2° C./min, and held at this temperature for 12 h, and then the temperature was ramped to 350° C. at the rate of 2°/min, and the material calcined at this temperature for 16 h. (It is noted that this catalyst could also have been prepared by adding potassium silicate to the precipitate prior to spray drying.)

Example 2

Addition of Silica Following Precipitation of Catalyst Material

Example 2A

AR52-01 (100Fe/4Cu/3K/5SiO$_2$; Silica Source: 30% LUDOX)

Into a 4 L beaker was placed 80.744 g Fe° (Hoganaes, Lot# 505729, 98.61%) and 3.20 g Cu° powder (Alpha Aesar, Lot# F17Q23, 99.5%, −40+100 mesh) along with 400 mL water; the mixture was mechanically stirred. Deionized (DI) water, 1208 mL, was used to dilute 288 mL HNO$_3$ (69%). The beaker containing Fe/Cu/H$_2$O was placed in an ice bath and the temperature was monitored. The acid solution was added drop-wise over 56 minutes keeping the temperature below 34° C. The ice bath was kept cold by adding more ice when needed to assure ice-water equilibrium. The mixture was stirred using an IKA-WERKE mechanical stirrer equipped with a 3-inch-4-propeller blade stirring at a rate of 220 rpm at room temperature for 2 hours. The Cu did not dissolve. The mixture was then heated to 70° C. and maintained at this temperature for 40 minutes, during which time the Cu appeared to dissolve, at about 65° C. The temperature may have slightly overshot due to a non-optimal placement of the thermocouple. A quantity of 250 mL ammonium hydroxide (29%) was diluted with 250 mL deionized water. A Eutech Instruments Oakton pH meter equipped with a semi-solids electrode was calibrated using Orion Application Solutions buffers at pH 4.00 and 7.00, and inserted into the reaction mixture, and the pH was monitored. The pH was initially 0.20. The ammonium hydroxide solution was added drop-wise over a period of 78 minutes and the pH changed to 7.16. The mechanical stirring was increased around pH 3.0 to a rate of 400 rpm due to a large amount of precipitation. After attaining pH 7.15, the addition of ammonium hydroxide was stopped and the stirring was continued for an additional 25 minutes.

Using a 4 L filter flask, a filter paper (VWR Qualitative slow flow 24.0 cm, Batch # F1732643), and a 25 cm Büchner funnel, the reaction mixture was filtered and rinsed three times, each time with 2.0 L deionized water. The initial filtrate had a deep blue color. The remaining moist solid was collected in a 2 L beaker and stored overnight. A quantity of 89.23 g of the 892.28 g moist solid was separated out, and 140 mL deionized water was added to the remaining 803.05 g. The obtained slurry was mechanically stirred until uniform. A quantity of 3.801 g K$_2$CO$_3$ in 100 mL deionized water was added and the mixture was stirred for another 15 minutes. An amount of 12.1 g LUDOX AS-30 (ammonia stabilized colloidal silica, 30 wt % suspension in water, Sigma-Aldrich, Lot # 16218BD) in 30 mL deionized water was then added and the mixture was stirred for another 25 minutes. The mixture was spray dried in a bench-scale Niro instrument and the coarse and fine samples were collected. The coarse sample was calcined 3 days later under the following conditions for the sample coded AR52-01B1: Heat at 30° C./min to 380° C., hold for 4 hours, then cool to room temperature.

Example 2B

AR52-02 and AR-52-09 (100Fe/4Cu/3K/5SiO$_2$; Silica Source: 30% LUDOX)

A larger batch than that of Example 2A was prepared by combining, prior to spray drying, two batches each similar to AR52-01 described in Example 2A hereinabove. The first batch of the two batches differed from AR52-01 in that (1) the nitric acid was added over 82 minutes, (2) the mixture was stirred at room temperature for 25 minutes after the nitric acid addition was complete, rather than for 2 hours, (3) after heating and cooling the reaction mixture the initial pH was 0.54, (4) the ammonium hydroxide solution was added drop-wise over 92 minutes, and (5) the pH changed to 7.15. This mixture was filtered using a Sigma Aldrich polypropylene filter paper (originally 102 cm wide cut to 24 cm diameter, Batch # 3110). The remaining moist solid from this batch was collected in a 2 L beaker and stored covered for 2 days. The second batch, made the following day, differed from AR52-01 in that: (1) the nitric acid solution was added over 74 minutes; (2) the pH before and after ammonium hydroxide addition was 1.01 and 7.15, respectively; and (3) the ammonium hydroxide solution was added over a period of 102 minutes.

The second batch was filtered using the filter paper described above for the first batch. The two batches were combined the following day into one 4 L beaker, 280 mL of water was added, and the mixture was stirred until uniform. A quantity of 8.448 g K$_2$CO$_3$ dissolved in 200 mL water was then added and stirring continued for 15 minutes. An amount of 26.9 g LUDOX 30 silica (as above) in 60 mL water was added and stirring continued for 25 minutes. The mixture was spray dried to microspheric particles in the size range of 40-100 micrometers, with a mean size of about 80 micrometer, using a Type H Mobil Niro Spray Dryer consisting of a two-fluid nozzle atomizer, drying chamber, air disperser, main chamber, product collection section, air ducts, cyclone, exhaust fan, air heater, and instrument panel. The feed slurry, at 16±1% solids, was introduced to the spray dryer through a nozzle from the bottom with the drying air cross-flowing from the top. The spray drying conditions were: Inlet temperature, 370±2° C., outlet temperature, 96±1° C., water setup flow, 4.0 to 4.5 kg/hr (feed flow is set with water then switched to the actual slurry feed); atomizer air flow, 1 bar with a 30% setting on a variable area flow meter. Coarse and fine samples were collected. The coarse sample was calcined under the following conditions: AR52-02B1 (1 day later)—Heat at 30° C./min to 380° C., hold for 4 hours then cool to room temperature; AR52-02B2 (6 days later)—Heat at 1° C./min to 300° C., hold for 4 hours then cool to room temperature at a rate of 1° C./min; AR52-02B2-b (32 days later)—Heat at 1° C./min to 300° C., hold for 4 hours then cool to room temperature at a rate of 1° C./min.

Example 2C

AR53-01 (100Fe/5Cu/3K/5SiO$_2$; Silica Source: 30% LUDOX)

The reagents and procedure for this batch were similar to the ones described for AR52-01 in Example 2A with the following differences: (1) 4.00 g Cu° (Alpha Aesar, Lot # B23L30, 99.5%, −150 mesh) were used; (2) the nitric acid solution was added drop-wise over 90 minutes; (3) after the addition of nitric acid was complete, the mixture was allowed to stir at room temperature for 25 minutes; (4) after heating and cooling the reaction mixture, ammonium hydroxide solution was added drop-wise over 90 minutes; and (5) the pH changed from 0.80 to 7.16. After filtration and rinsing, the solid was collected and stored in a 2 L beaker and left covered overnight. A quantity of 89.41 g of the 894.05 g of moist solid was separated out, and 140 mL deionized water was added to the remaining 804.64 g. A slurry was made using the same procedure as described for AR52-01. The mixture was spray dried as described in Example 2B hereinabove; coarse and fine samples were collected. Coarse sample was calcined the same day under the following conditions for the sample coded AR53-01B1: Heat at 30° C./min to 380° C., hold for 4 hours then cool to room temperature.

Example 2D

AR54-01 (100Fe/3Cu/3K/5SiO$_2$; Silica Source: 34% TMA LUDOX)

The same reagents and procedure described for AR52-01 in Example 2A were used with the following exceptions. Quantities of 40.372 g Fe°, 1.20 g Cu°, and 200 mL deionized water were placed in a 2 L beaker. The nitric acid solution was prepared by adding 288 mL HNO$_3$ (69%) to 1208 mL deionized water. Nitric acid solution was added to the Fe/Cu/H$_2$O mixture over 45 minutes and the reaction mixture was allowed to stir for an additional 25 minutes before heating and cooling the mixture. Ammonium hydroxide (made by diluting 125 mL of 29% ammonium hydroxide with 125 mL deionized water) was added and the pH altered from 0.90 to 7.17. The solution was filtered using filter paper (VWR Qualitative slow flow 24.0 cm, Batch # F1732643) and rinsed with 3×1.5 L portions of deionized water. The remaining solid was collected and stored in a covered 1 L beaker overnight.

The 412.13 g of moist solid was then divided into 2 equal mass portions. 100 mL deionized water was added to the first portion and stirred until uniform. A quantity of 1.056 g potassium carbonate in 140 mL deionized water was added slowly to the mixture. The mixture was stirred for 15 minutes, sonicated for 10 minutes. Next, 2.965 g silica solution (tetramethyl ammonium stabilized colloidal silica, 34 wt % suspension in water, Sigma-Aldrich, Lot # 12806HE) in 200 mL deionized water was added and this mixture was stirred for an additional 15 minutes. The pH of this slurry was reduced from 7.35 to 4.00 by the addition of concentrated nitric acid. This was then spray dried using a Büchi Mini Spray Dryer B-290 under the following settings: Inlet temperature 220° C., Outlet temperature 102° C., Pump 40%, Aspirator 100%, Nozzle setting 9, Chiller temperature 10.1° C. The fine sample collected was labeled AR54-01A2 and calcined under the following conditions: Heat at 30° C./min to 380° C., hold for 4 hours then cool to room temperature.

Example 2E

AR57-01 (100Fe/4Cu/3K/5SiO$_2$; Silica Source: 34% TMA LUDOX)

The same reagents and procedure described for AR52-01 in Example 2A were used with the following exceptions: (1) 3.20 g Cu° (Alpha Aesar, Lot # B23L30, 99.5%, −150 mesh) were used; (2) the temperature of the reaction mixture during the addition of nitric acid did not rise above 33° C.; and (3) the acid was added over 65 minutes. After heating and cooling the reaction mixture, the pH was 0.73 and changed to 7.14 over the 92 minutes it took to add the ammonium hydroxide. The mixture was filtered and rinsed and stored in a 1 L beaker overnight. A volume of 100 mL deionized water was then added to the 872.42 g of moist solid and this was stirred until uniform. A quantity of 4.224 g potassium carbonate in 140 mL deionized water was then added slowly and stirring continued for an additional 15 minutes. An amount of 11.862 g of silica solution (tetramethyl ammonium stabilized colloidal silica, 34 wt % suspension in water, Sigma-Aldrich, Lot # 12806HE) was added with 30 mL deionized water and the mixture was stirred for another 25 minutes, then spray dried as described in Example 2B hereinabove. The coarse sample was calcined 1 day later under the following conditions: AR57-01B1—Heat at 30° C./min to 380° C., hold for 4 hours, then cool to room temperature. AR57-01B2—Heat at 1° C./min to 300° C., hold for 4 hours then cool to room temperature at a rate of 1° C./min.

Example 2F

AR64-01 (100Fe/4Cu/3K/5SiO$_2$; Silica Source: Polysilicic Acid)

80.744 g iron powder (Hoeganaes, 98.61%, −325 mesh) and 3.200 g copper powder (Alfa Aesar, 99.5%, +100/−40 mesh) were slurried with 400 ml of deionized water. 403.2 g (288 ml) of 70% nitric acid, HNO$_3$, from Fisher Scientific (Certified ACS PLUS grade), was dissolved in 1,208 ml of deionized water. Under mechanical stirring, the nitric acid solution was added to the iron-copper slurry dropwise. The initial addition rate was 5-6 ml/min to keep the temperature of the mixture at or below 30° C. The rate of addition was then increased without increasing the temperature above 30° C., and the addition of the acid was complete after about 82 minutes. The mixture was stirred for an additional period of 30 minutes without heating, and then was heated to 70° C. at ~3° C./min and maintained at 70° C. for 40 minutes. The solution was then cooled to 35° C. or below as quickly as possible. 500 ml of a solution of 14.5% ammonium hydroxide (NH$_4$OH, EMO, 28-30%, ACS reagent grade) was prepared by combining equal volumes of the concentrated ammonium hydroxide and deionized water. This base solution was added slowly to the iron-copper nitrate solution while keeping the temperature at the range of 20° C.-30° C. over 91 minutes while monitoring the pH of the mixture; no heating was applied. A metal oxide precipitate was formed. The base addition was continued until the pH was 7.15±0.1. The mixture was then stirred at 20° C.-30° C. for 30 minutes at the same pH. The precipitate was filtered over a Büchner funnel and washed three times with 2,000 ml of deionized water (total of 6,000 ml). While filtering, the catalyst was mixed manually periodically to afford effective washing and allow homogenous contact between the rinse water and the solid. The iron-copper oxide filter residue was dried to a sufficient dryness level to allow easy removal from the filter paper, and was transferred to a 2-liter beaker and stored covered overnight. Polysilicic acid was prepared as follows. 100 g of Dowex® 50WX4-50 ion exchange resin from Sigma-Aldrich was placed in a 600 ml beaker and 200 ml of deionized water was added. Under stirring, 50 ml of concentrated hydrochloric acid (20° Interstate Chemical Company) was added and stirring continued for 20 minutes. The resin was filtered using a filter flask and rinsed with three portions of 2,000 ml deionized water, then transferred to as 200 ml beaker that was placed in an ice-water bath. 50 ml of deionized water was added to the beaker containing the ion exchange resin and the mixture was stirred vigorously until the temperature was below 5° C. Meanwhile, another solution was prepared by adding 28.9 ml of potassium silicate solution (Kasil® 1, The PQ Corporation) to 50 ml deionized water and this solution was stirred and placed in another ice-water bath until the temperature was below 5° C. The solution was then transferred to a dropping funnel and added at a rate of about 1 drop per second to the mixture containing the acid treated ion exchange resin until the addition was complete. The mixture was then filtered using a filter flask and the resin was rinsed with 20 ml deionized water. The filtrate of the so-obtained polysilicic acid was stored before use for up to one hour. 100 ml deionized water was added to the iron-copper oxide to produce a thick slurry. A solution of 4.224 g potassium carbonate ($K_2CO_3$, Alfa Aesar, ACS reagent grade) in 30 ml deionized water was added to the slurry and mixed well with it. Then the polysilicic acid solution was added to the slurry and mixed well with it for 10 minutes. The obtained mixture was spray dried to microspheric particles in the size range of 40-100 micrometers, as described in Example 2B hereinabove. After spray drying, 41.5 g of fines and 110.0 g of coarse sample were recovered. The coarse spray dried sample was calcined in a porcelain crucible soon after the spray drying to minimize aging. The material was calcined at 300° C. for 4 hours, at a heating and cooling rate of 1° C./min.

Example 2G

AR69-01 (100Fe/4Cu/3K/5SiO$_2$; Silica Source: LUDOX®AS-30)

80.744 g iron powder (Hoeganaes, 98.61%, −325 mesh) and 3.200 g copper powder (Alfa Aesar, 99.5%, +100/−40 mesh) were slurried with 400 ml of deionized water. 403.2 g (288 ml) of 70% nitric acid, $HNO_3$, from Fisher Scientific (Certified ACS PLUS grade), was dissolved in 1,208 ml of deionized water. Under mechanical stirring, the nitric acid solution was added to the iron-copper slurry dropwise. The initial addition rate was 5-6 ml/min to keep the temperature of the mixture at or below 34° C. The rate of addition was then increased without increasing the temperature above 34° C., and the addition of the acid was complete after about 93 minutes. The mixture was stirred for an additional period of 30 minutes at 35° C., and then was heated to 70° C. at ~3° C./min and maintained at 70° C. for 40 minutes. A sodium carbonate solution was prepared by combining 246.14 g anhydrous $Na_2CO_3$ with 800 ml deionized water and the solution was heated to 80° C. The initial temperature and pH of the base solution was recorded to be 83° C. and 10.79. The initial acid temperature was 67° C. The iron-copper nitrate (acid) solution was added to the base solution within 6 minutes, with vigorous stirring, and the resulting mixture with the metal oxide precipitate was filtered immediately over a Büchner funnel and washed six times with 2,000 ml of deionized water (total of 12,000 ml). The rinse water was at 85-90° C. While filtering, the catalyst was mixed manually periodically to afford effective washing and allow homogenous contact between the rinse water and the solid. After the fourth washing the filter funnel was covered and left untouched overnight before continuing the last two washings. The iron-copper oxide filter residue was dried to a sufficient dryness level to allow easy removal from the filter paper, and was transferred to a 2-liter beaker. 100 ml deionized water was added to the iron-copper oxide to produce a thick slurry. A solution of 4.224 g potassium carbonate ($K_2CO_3$, Alfa Aesar, ACS reagent grade) in 140 ml deionized water was added to the slurry and mixed well with it. Then LUDOX® AS-30 (colloidal silica, Sigma-Aldrich), 13.440 g diluted with 30 ml deionized water, was also added and mixed well with the slurry. The obtained mixture was spray dried to microspheric particles followed by calcination as above (Example 2F). After spray drying, and prior to calcination, 36.7 g of fines and 82.9 g of coarse sample were recovered.

Example 2H

AR70-01 (100Fe/4Cu/3K/5SiO$_2$; Silica Source: Polysilicic Acid)

80.744 g iron powder (Hoeganaes, 98.61%, −325 mesh) and 3.200 g copper powder (Alfa Aesar, 99.5%, +100/−40 mesh) were slurried with 400 ml of deionized water. 403.2 g (288 ml) of 70% nitric acid, $HNO_3$, from Fisher Scientific (Certified ACS PLUS grade), was dissolved in 1,208 ml of deionized water. Under mechanical stirring, the nitric acid solution was added to the iron-copper slurry dropwise. The initial addition rate was 5-6 ml/min to keep the temperature of the mixture at or below 34° C. The rate of addition was then increased without increasing the temperature above 34° C., and the addition of the acid was complete after about 94 minutes. The mixture was stirred for an additional period of 25 minutes at 35° C., and then was heated to 70° C. at ~3° C./min and maintained at 70° C. for 40 minutes. A sodium carbonate solution was prepared by combining 246.14 g anhydrous $Na_2CO_3$ with 800 ml deionized water and the solution was heated to 80° C. The initial temperature and pH of the base solution was recorded to be 88° C. and 10.23, respectively. The initial acid temperature was 80° C. The iron-copper nitrate (acid) solution was added to the base solution within 5 minutes, with vigorous stirring, and the resulting mixture with the metal oxide precipitate was filtered immediately over a Büchner funnel and washed six times with 2,000 ml of deionized water (total of 12,000 ml). The rinse water was at 85-90° C. While filtering, the catalyst was mixed manually periodically to afford effective washing and allow homogenous contact between the rinse water and the solid. After the third washing the filter funnel was covered and left untouched overnight before continuing the last three washings. The iron-copper oxide filter residue was dried to a sufficient dryness level to allow easy removal from the filter paper, and was transferred to a 2-liter beaker. Polysilicic acid was prepared as above (Example 2F). 100 ml deionized water was added to the iron-copper oxide to produce a thick slurry. A solution of 4.224 g potassium carbonate ($K_2CO_3$, Alfa Aesar, ACS reagent grade) in 30 ml deionized water was added to the slurry and mixed well with it. Then the polysilicic acid solution was added to the slurry and mixed well with it for 10 minutes. The obtained mixture was spray dried to microspheric particles that were subsequently calcined, as above (Example 2F). After spray drying, and prior to calcination, 49.5 g of fines and 83.5 g of coarse sample were recovered.

Example 2I

AR72-02 (100Fe/4Cu/3K/5SiO$_2$; Silica Source: LUDOX®AS-30)

72.67 g iron powder (Hoeganaes, 98.61%, -325 mesh) was slurried with 360 ml of deionized water. 362.9 g (259.2 ml) of 70% nitric acid, $HNO_3$, from Fisher Scientific (Certified ACS PLUS grade), was dissolved in 1,087 ml of deionized water. Under mechanical stirring, the nitric acid solution was added to the iron slurry dropwise. The initial addition rate was 5 -6 ml/min to keep the temperature of the mixture at or below 32° C. The rate of addition was then increased without increasing the temperature above 32° C., and the addition of the acid was complete after about 70 minutes. The mixture was stirred for an additional period of 25 minutes at 35° C., and then was heated to 70° C. at ~3° C/min and maintained at 70° C. for 40 minutes. The solution was then cooled to 35° C. as quickly as possible. In a separate beaker, 8.074 g iron (as above) was slurried with 40 ml deionized water. An acid solution was prepared by dissolving 28.8ml nitric acid (as above) in 121 ml deionized water. The acid solution was added to the iron slurry slowly at a temperature not higher than 28° C. This solution was added to the other solution. 500ml of a solution of 14.5% ammonium hydroxide ($NH_4OH$, EMO, 28-30%, ACS reagent grade) was prepared by combining equal volumes of the concentrated ammonium hydroxide and deionized water. This base solution was added slowly to the iron-copper nitrate solution while keeping the temperature at the range of 20 -30° C. over 106 minutes while monitoring the pH of the mixture; no heating was applied. A metal oxide precipitate was formed. The base addition was continued until the pH was 7.15 ±0.1. The mixture was then stirred at 20 -30° C. for 30 minutes at the same pH. The precipitate was filtered over a Buchner funnel and washed two times with 2,000ml of deionized water (total of 4,000 ml). While filtering, the catalyst was mixed manually periodically to afford effective washing and allow homogenous contact between the rinse water and the solid. The iron oxide filter residue was dried to a sufficient dryness level to allow easy removal from the filter paper, and was transferred to a 2-liter beaker and stored covered overnight. A solution of 11.721 g of copper nitrate hemipentahydrate ($Cu(NO_3)_2 \cdot 2.5H_2O$, Sigma-Aldrich, 98%, ACS reagent grade) in 100 ml deionized water, was added to the iron oxide to produce a thick slurry. A solution of 4.224 g potassium carbonate ($K_2CO_3$, Alfa Aesar, ACS reagent grade) in 140 ml deionized water was subsequently added to the slurry and mixed well with it. Then LUDOX® AS-30 (colloidal silica, Sigma-Aldrich), 13.440 g diluted with 30 ml deionized water, was also added and mixed well with the slurry. The obtained mixture was spray dried to microspheric particles followed by calcination as above (Example 2F). After spray drying, and prior to calcination, 40.9 g of fines and 72.8 g of coarse sample were recovered.

Example 2J

Catalyst Testing: Short Time

Short-time catalytic testing experiments were run in slurry bed using a 300-ML and 1-L continuous stirred tank reactors (CSTRs). 3.75 grams of catalyst was slurried in 150 mL grams of Durasyn 164 oil in the small reactor and 300 mL Durasyn 164 in the large reactor. Table 1 summarizes data obtained under FTS (Fischer-Tropsch Synthesis) conditions for runs with the catalysts of Examples 2B-2E.

TABLE 1

Short-Time AR Catalyst Tests

| Catalyst & Exp # | Fe,Cu,K,$SiO_2$ | Calcination C/min-C.-hr | Reactor Hours | CO | $CO_2$ | $CH_4$ | Paraffin alpha | Olefin alpha | $H_2$ |
|---|---|---|---|---|---|---|---|---|---|
| AR53-01B1 F30 | 100-4-3-5 | 30-380-4 | 24.5 | 60.9 | 49.0 | 1.1 | 0.85 | 0.85 | 43.1 |
| | | | 27.3 | 61.8 | 51.8 | 1.5 | 0.83 | 0.84 | 46.4 |
| | | | 48.4 | 61.5 | 48.7 | 1.2 | 0.84 | 0.85 | 42.7 |
| | | | 54.0 | 60.8 | 48.1 | 1.2 | 0.84 | 0.85 | 43.8 |
| | | | 74.6 | 53.4 | 48.4 | 1.1 | 0.85 | 0.86 | 38.7 |
| | | | 75.9 | 53.4 | 48.3 | 1.1 | 0.84 | 0.86 | 35.9 |
| | | | 96.0 | 53.3 | 50.4 | 1.1 | 0.86 | 0.87 | 44.7 |
| AR54-01A2 F31 | 100-3-3-5 | 30-380-4 | 24.5 | 44.0 | 48.4 | 1.4 | 0.83 | 0.84 | 33.9 |
| | | | 27.3 | 44.2 | 47.6 | 1.4 | 0.83 | 0.84 | 33.3 |
| | | | 48.4 | 41.6 | 50.4 | 1.5 | 0.83 | 0.84 | 33.6 |
| | | | 54.0 | 42.3 | 43.5 | 1.4 | 0.83 | 0.84 | 37.4 |
| | | | 74.6 | 44.2 | 43.8 | 1.3 | 0.83 | 0.84 | 36.0 |
| | | | 75.9 | 43.9 | 46.0 | 1.4 | 0.82 | 0.83 | 33.2 |
| | | | 96.0 | 43.3 | 47.6 | 1.4 | 0.83 | 0.84 | 35.3 |
| AR52-02B1 H32 | 100-4-3-5 | 30-380-4 | 26.0 | 57.1 | 48.6 | 1.0 | 0.86 | 0.86 | 43.6 |
| | | | 29.8 | 55.4 | 52.2 | 1.1 | 0.86 | 0.87 | 43.6 |
| AR52-02B2 F32 | 100-4-3-5 | 1-300-4 | 25.5 | 69.8 | 50.5 | 1.2 | 0.85 | 0.86 | 51.0 |
| | | | 30.2 | 68.4 | 50.6 | 1.2 | 0.85 | 0.86 | 53.2 |
| | | | 47.2 | 67.4 | 48.9 | 1.3 | 0.85 | 0.85 | 54.3 |
| | | | 49.9 | 66.1 | 49.5 | 1.3 | 0.84 | 0.85 | 52.5 |
| | | | 54.0 | 66.9 | 49.3 | 1.3 | 0.84 | 0.85 | 52.2 |
| | | | 70.9 | 67.7 | 48.6 | 1.3 | 0.83 | 0.84 | 49.2 |
| | | | 72.8 | 67.6 | 49.0 | 1.3 | 0.83 | 0.84 | 47.9 |
| | | | 76.4 | 66.6 | 51.0 | 1.4 | 0.83 | 0.84 | 46.1 |
| | | | 94.4 | 67.7 | 44.0 | 1.3 | 0.82 | 0.83 | 50.0 |
| | | | 95.2 | 66.1 | 47.1 | 1.3 | 0.82 | 0.83 | 46.4 |
| AR57-01B2 H33 | 100-4-3-5 | 1-300-4 | 22.7 | 75.1 | 49.7 | 1.3 | 0.84 | 0.85 | 61.5 |
| | | | 25.5 | 73.8 | 50.6 | 1.3 | 0.85 | 0.85 | 60.2 |
| | | | 30.1 | 73.2 | 49.0 | 1.3 | 0.84 | 0.85 | 59.2 |
| | | | 47.8 | 72.3 | 51.4 | 1.4 | 0.84 | 0.84 | 56.0 |
| | | | 71.6 | 71.1 | 50.3 | 1.4 | 0.83 | 0.83 | 49.6 |
| | | | 79.9 | 71.6 | 50.8 | 1.5 | 0.83 | 0.84 | 52.2 |
| | | | 96.3 | 69.8 | 49.8 | 1.5 | 0.82 | 0.83 | 54.0 |
| | | | 99.0 | 70.0 | 49.8 | 1.6 | 0.82 | 0.83 | 54.1 |

TABLE 1-continued

Short-Time AR Catalyst Tests

| Catalyst & Exp # | Fe,Cu,K,SiO$_2$ | Calcination C/min-C.-hr | Reactor Hours | CO | CO$_2$ | CH$_4$ | Paraffin alpha | Olefin alpha | H$_2$ |
|---|---|---|---|---|---|---|---|---|---|
| AR52-02B2 (1-L Reactor) F33 | 100-4-3-5 | 1-300-4 | 23.1 | 76.9 | 50.0 | 1.3 | 0.83 | 0.84 | 50.6 |
| | | | 50.4 | 69.4 | 49.6 | 1.4 | 0.83 | 0.84 | 50.8 |
| | | | 53.4 | 68.4 | 50.4 | 1.4 | 0.83 | 0.84 | 48.0 |
| | | | 119.3 | 65.5 | 46.9 | 1.5 | 0.82 | 0.83 | 49.1 |
| | | | 121.1 | 65.4 | 47.4 | 1.5 | 0.82 | 0.83 | 48.7 |
| | | | 142.8 | 62.6 | 48.0 | 1.6 | 0.82 | 0.83 | 46.2 |
| | | | 173.3 | 58.8 | 47.7 | 1.3 | 0.84 | 0.84 | 45.1 |
| | | | 191.1 | 57.4 | 43.9 | 1.3 | 0.84 | 0.85 | 51.1 |
| | | | 196.8 | 57.4 | 44.4 | 1.3 | 0.83 | 0.84 | 45.3 |
| | | | 215.0 | 54.2 | 46.3 | 1.5 | 0.82 | 0.83 | 39.8 |
| | | | 216.2 | 49.9 | 43.7 | 1.8 | 0.83 | 0.84 | 47.0 |
| | | | 287.1 | 37.8 | 49.5 | 2.6 | 0.78 | 0.80 | 32.7 |
| AR52-02B4 H34 | 100-4-3-5 | 0.3-319-16 | 23.6 | 59.0 | 48.3 | 1.1 | 0.85 | 0.86 | 45.2 |
| | | | 30.6 | 59.1 | 49.2 | 1.2 | 0.85 | 0.85 | 45.2 |
| | | | 77.3 | 58.7 | 47.0 | 1.3 | 0.83 | 0.84 | 43.3 |
| | | | 70.9 | 57.0 | 44.7 | 1.3 | 0.84 | 0.85 | 49.8 |
| | | | 98.4 | 57.0 | 45.2 | 1.3 | 0.83 | 0.84 | 43.6 |
| AR52-02B5 H35 | 100-4-3-5 | 1-350-4 | 22.7 | 54.7 | 46.7 | 1.2 | 0.84 | 0.84 | 40.3 |
| | | | 25.4 | 54.7 | 47.7 | 1.3 | 0.83 | 0.84 | 39.8 |
| | | | 48.0 | 46.2 | 44.2 | 1.1 | 0.84 | 0.85 | 36.7 |
| | | | 71.5 | 37.9 | 45.6 | 1.2 | 0.84 | 0.84 | 29.0 |
| AR52-02B2-b (1-L Reactor) F34 | 100-4-3-5 | 1-300-4 | 22.5 | 60.9 | 50.7 | 1.5 | 0.82 | 0.83 | 41.9 |
| AR52-02B2-b (1-L Reactor) F35 | 100-4-3-5 | 1-300-4 | 22.8 | 68.1 | 41.7 | 2.3 | 0.68 | 0.70 | 32.4 |
| | | | 26.4 | 61.1 | 46.8 | 1.7 | 0.78 | 0.80 | 36.7 |
| | | | 28.1 | 58.7 | 48.3 | 1.6 | 0.79 | 0.81 | 33.3 |
| | | | 70.6 | 58.8 | 47.5 | 1.4 | 0.83 | 0.84 | 44.4 |
| | | | 75.4 | 58.4 | 49.1 | 1.5 | 0.82 | 0.83 | 39.8 |
| | | | 93.4 | 57.8 | 46.5 | 1.5 | 0.83 | 0.84 | 46.8 |
| | | | 173.5 | 49.8 | 44.0 | 1.8 | 0.80 | 0.81 | 37.9 |
| | | | 191.8 | 47.3 | 45.4 | 1.9 | 0.79 | 0.80 | 36.1 |
| AR57-01B2-c H37 | 100-4-3-5 | 1-300-4 | 79.0 | 52.1 | 43.9 | 1.3 | 0.84 | 0.84 | 43.3 |
| AR52-06B1 H38 | 100-4-3-5 | 1-300-4 | 24.2 | 52.9 | 44.3 | 1.2 | 0.84 | 0.85 | 42.3 |
| | | | 26.2 | 53.2 | 44.2 | 1.2 | 0.84 | 0.85 | 41.6 |
| | | | 27.6 | 53.5 | 43.6 | 1.2 | 0.84 | 0.85 | 41.5 |
| | | | 97.0 | 41.2 | 46.6 | 1.8 | 0.81 | 0.82 | 35.1 |
| AR52-06B1 (1-L Reactor) F36 | 100-4-3-5 | 1-300-4 | 24.2 | 64.0 | 50.7 | 1.2 | 0.84 | 0.85 | 43.0 |
| | | | 96.7 | 61.6 | 48.9 | 1.4 | 0.83 | 0.84 | 44.0 |
| | | | 119.8 | 56.3 | 47.7 | 1.5 | 0.82 | 0.83 | 42.9 |
| | | | 122.4 | 55.5 | 48.8 | 1.6 | 0.82 | 0.83 | 40.1 |
| | | | 142.3 | 51.5 | 48.6 | 1.7 | 0.82 | 0.83 | 41.3 |
| | | | 151.4 | 51.1 | 47.6 | 1.7 | 0.81 | 0.82 | 40.7 |
| | | | 167.3 | 47.5 | 34.7 | 1.9 | 0.77 | 0.78 | 41.5 |
| AR52-06B1 H39 | 100-4-3-5 | 1-300-4 | 25.3 | 81.9 | 44.1 | 2.2 | 0.77 | 0.79 | 67.5 |
| | | | 41.8 | 86.6 | 46.3 | 1.9 | 0.80 | 0.81 | 73.5 |
| | | | 67.4 | 83.1 | 48.4 | 2.2 | 0.79 | 0.80 | 68.3 |
| AR52-06B1 (1-L Reactor) F37 | 100-4-3-5 | 1-300-4 | 25.9 | 86.9 | 49.5 | 2.0 | 0.80 | 0.81 | 63.1 |
| | | | 43.4 | 86.8 | 49.8 | 1.9 | 0.80 | 0.81 | 62.0 |
| | | | 63.8 | 82.9 | 50.7 | 1.8 | 0.80 | 0.81 | 56.4 |
| | | | 69.6 | 82.4 | 51.8 | 1.8 | 0.80 | 0.81 | 55.8 |
| | | | 86.9 | 79.9 | 51.9 | 1.5 | 0.83 | 0.84 | 61.6 |
| | | | 96.5 | 78.8 | 52.5 | 2.0 | 0.79 | 0.80 | 50.7 |
| | | | 161.0 | 71.5 | 48.1 | 2.7 | 0.76 | 0.77 | 53.2 |
| | | | 162.5 | 70.7 | 50.1 | 2.1 | 0.79 | 0.80 | 52.0 |
| | | | 184.8 | 66.4 | 53.1 | 2.4 | 0.78 | 0.80 | 48.1 |
| | | | 210.5 | 63.2 | 50.5 | 2.5 | 0.76 | 0.78 | 43.5 |
| AR57-03B1 H40 | 100-4-3-5 | 1-300-4 | 30.0 | 84.9 | 42.5 | 1.9 | 0.79 | 0.80 | 69.4 |
| | | | 49.4 | 83.6 | 45.5 | 2.0 | 0.79 | 0.81 | 69.8 |
| | | | 72.7 | 77.6 | 51.0 | 2.3 | 0.79 | 0.80 | 59.5 |
| AR57-03B1 H41 | 100-4-3-5 | 1 -300-4 | 40.3 | 69.5 | 52.8 | 2.3 | 0.80 | 0.81 | 52.8 |
| | | | 44.9 | 69.9 | 53.4 | 2.3 | 0.80 | 0.81 | 51.4 |
| | | | 67.2 | 76.9 | 35.8 | 1.7 | 0.80 | 0.81 | 69.5 |
| | | | 90.7 | 68.9 | 50.6 | 2.3 | 0.79 | 0.80 | 54.8 |
| | | | 81.6 | 69.0 | 50.1 | 2.3 | 0.77 | 0.79 | 48.5 |
| AR57-03B1 (1-L Reactor) F38 | 100-4-3-5 | 1-300-4 | 39.4 | 79.2 | 49.6 | 1.9 | 0.80 | 0.81 | 59.2 |
| | | | 64.3 | 76.7 | 49.5 | 1.6 | 0.82 | 0.83 | 57.6 |
| | | | 91.9 | 74.2 | 49.0 | 1.7 | 0.81 | 0.82 | 51.3 |
| | | | 94.1 | 73.4 | 49.4 | 1.7 | 0.80 | 0.82 | 49.9 |
| | | | 163.7 | 60.8 | 51.5 | 2.1 | 0.80 | 0.81 | 44.4 |
| | | | 186.0 | 56.1 | 50.7 | 2.3 | 0.78 | 0.80 | 40.5 |
| AR57-03B1 (1-L Reactor) F39 | 100-4-3-5 | 1-300-4 | 92.4 | 56.8 | 74.8 | 2.3 | 0.84 | 0.84 | 44.2 |
| | | | 98.2 | 63.1 | 54.7 | 2.1 | 0.80 | 0.82 | 45.5 |
| | | | 114.7 | 64.2 | 50.1 | 2.0 | 0.80 | 0.81 | 47.6 |
| | | | 117.1 | 64.9 | 48.5 | 1.9 | 0.80 | 0.81 | 49.4 |

TABLE 1-continued

Short-Time AR Catalyst Tests

| Catalyst & Exp # | Fe,Cu,K,SiO$_2$ | Calcination C/min-C.-hr | Reactor Hours | CO | CO$_2$ | CH$_4$ | Paraffin alpha | Olefin alpha | H$_2$ |
|---|---|---|---|---|---|---|---|---|---|
| | | | 139.0 | 63.2 | 48.4 | 2.0 | 0.80 | 0.81 | 50.8 |
| | | | 162.5 | 61.4 | 48.6 | 2.1 | 0.79 | 0.80 | 48.1 |
| AR52-09B1 H43 | 100-4-3-5 | 1-300-4 | 42.5 | 88.7 | 47.2 | 1.9 | 0.80 | 0.81 | 74.5 |
| | | | 46.8 | 87.6 | 48.0 | 2.0 | 0.81 | 0.82 | 76.4 |
| | | | 65.3 | 89.3 | 33.0 | 1.7 | 0.78 | 0.79 | 80.4 |
| | | | 73.0 | 86.9 | 34.8 | 1.7 | 0.78 | 0.79 | 75.1 |
| | | | 90.5 | 84.6 | 52.0 | 2.1 | 0.79 | 0.81 | 63.0 |
| | | | 92.4 | 84.7 | 53.5 | 2.2 | 0.80 | 0.81 | 70.3 |
| AR57-03B1 H44 | 100-4-3-5 | 1-300-4 | 11.4 | 67.9 | 51.3 | 1.1 | 0.85 | 0.86 | 48.0 |
| | | | 30.0 | 68.9 | 49.5 | 1.3 | 0.84 | 0.85 | 51.7 |
| | | | 57.4 | 60.2 | 52.8 | 1.3 | 0.84 | 0.85 | 44.2 |
| | | | 59.5 | 60.7 | 51.2 | 1.3 | 0.84 | 0.85 | 42.7 |
| | | | 78.0 | 58.9 | 50.5 | 1.4 | 0.83 | 0.84 | 40.6 |
| | | | 79.4 | 59.8 | 48.9 | 1.3 | 0.83 | 0.84 | 41.9 |
| AR64-01B1 (1-L Reactor) F40 | 100-4-3-5 | 1-300-4 | 43.0 | 15.6 | 33.2 | 2.1 | 0.73 | 0.75 | 12.0 |
| | | | 48.5 | 19.1 | 20.5 | 1.4 | 0.59 | 0.63 | 13.5 |
| | | | 56.2 | 7.7 | 31.7 | 2.4 | −0.49 | −1.34 | 2.4 |
| AR64-01B1 H46 | 100-4-3-5 | 1-300-4 | 43.0 | 55.7 | 45.1 | 2.0 | 0.79 | 0.81 | 44.5 |
| | | | 47.0 | 52.8 | 50.9 | 2.3 | 0.79 | 0.80 | 39.6 |
| | | | 66.2 | 42.7 | 95.8 | 4.6 | 0.77 | 0.78 | 16.5 |
| | | | 88.3 | 28.8 | 128.42 | 4.7 | 0.84 | 0.85 | 32.7 |
| AR69-01B1 H50 | 100-4-3-5 | 1-300-4 | 24.0 | 86.7 | 45.8 | 1.8 | 0.80 | 0.81 | 69.0 |
| | | | 40.8 | 89.5 | 44.7 | 1.5 | 0.82 | 0.83 | 70.7 |
| | | | 46.6 | 87.7 | 46.0 | 1.5 | 0.81 | 0.83 | 65.4 |
| | | | 65.8 | 89.3 | 44.2 | 1.4 | 0.82 | 0.83 | 69.4 |
| | | | 89.3 | 86.5 | u | u | u | u | 68.7 |
| AR-69-01B1 (1-L Reactor) F48 | 100-4-3-5 | 1-300-4 | 24.0 | 74.4 | 48.2 | 1.1 | 0.85 | 0.86 | 69.9 |
| | | | 28.3 | 75.0 | 48.1 | 1.1 | 0.85 | 0.86 | 72.4 |
| | | | 47.5 | 75.6 | 49.0 | 1.1 | 0.85 | 0.86 | 68.6 |
| | | | 49.7 | 75.4 | 49.3 | 1.1 | 0.85 | 0.86 | 68.5 |
| | | | 50.6 | 75.3 | 49.3 | 1.1 | 0.85 | 0.85 | 62.9 |
| | | | 52.6 | 75.0 | 49.0 | 1.1 | 0.85 | 0.86 | 66.4 |
| | | | 120.2 | 65.9 | 50.1 | 1.1 | 0.85 | 0.86 | 59.0 |
| | | | 123.4 | 72.7 | 48.1 | 1.2 | 0.85 | 0.85 | 65.0 |
| | | | 142.6 | 69.7 | 50.2 | 1.3 | 0.84 | 0.85 | 61.6 |
| | | | 145.9 | 72.9 | 49.5 | 1.3 | 0.84 | 0.85 | 64.8 |
| | | | 149.0 | 72.2 | 49.6 | 1.3 | 0.84 | 0.85 | 65.0 |
| | | | 166.6 | 69.4 | 50.0 | 1.3 | 0.84 | 0.85 | 62.6 |
| | | | 168.7 | 73.1 | 49.2 | 1.3 | 0.84 | 0.84 | 65.9 |
| | | | 170.2 | 74.3 | 47.8 | 1.3 | 0.83 | 0.84 | 67.2 | u, unavailable data.

Unless otherwise mentioned, the run was performed on the small CSTR. In Table 1 catalyst composition is given in the second column from left as relative mass, catalyst calcination conditions are presented in the third column from left as "rate of heating"-"calcination temperature"-"calcination time". "Reaction hours" in column four from left is time on stream (TOS). The next columns to the left are: "CO"-percent CO conversion; "CO$_2$"—CO$_2$ selectivity, percent formed in gas; "CH$_4$"—methane selectivity as percent of product; "Paraffin alpha"—calculated Anderson-Schulz-Flory (ASF) chain growth probability of paraffins; "Olefin alpha"—ASF calculated for olefins. The last column from left to right is hydrogen conversion (%). For Experiments F30 to F36 and H32 to H38, in situ catalyst activation was performed according to the "Typhoon" procedure, with H$_2$:CO mol ratio of 1.4, at 275° C., under 140 psig pressure, for 24 hr. Experiments F37, F39, H39 and H40 were run with activation under 100% CO; H43, H50 and F48 under 100% CO at 230° C., 140 psig. Experiments F39 and H41 were run after activation under 100% H$_2$, 140 psig, at 275° C.; Experiments F40 and H46 were run after catalyst activation with 100% H$_2$ at 220° C. Experiment H44 was run after activation under H$_2$:CO (ratio 0.77) at 210° C. for 6 hr. An observation of Table 1 reveals that using the Typhoon activation only a few tests showed a good combination of stability and activity. Experiment F31 shows the effect of less Cu in the catalyst: A drastic loss of activity; but high stability as judged by the "Rate of Overall Activity Decline" (ROAD, see above) of 0.010. In Experiments F32 and H33 the catalyst had high stability (ROAD-0.042 and 0.051, respectively) at high activity in the range of 66-75%. In H34, at moderate activity, ROAD was even lower (0.020). In Experiment H34, the catalyst had even better stability but at less activity. CO activation gave catalyst with higher activity (% CO conversion in the 70s and 80s), but ROAD was too high except in H43 in which high activity and high stability (ROAD-0.043) were obtained, apparently as a result of conducting the activation at lower temperature (230° C. instead of 275° C.). Catalyst AR69 prepared according to Example 2G was too active after CO activation as shown in run H50. The initial reaction temperature of 255° C. was reduced after 46.6 hr on stream to 250° C., but activity remained very high, in the 85-90% CO conversion range. Therefore, a second run, F48, was conducted with the same catalyst activated similarly, in the larger reactor at an initial temperature of 250° C. The initial CO conversion dropped to 75% and over time, when it declined, the temperature was slightly raised to prevent strong deactivation. It was thus possible to maintain a constant activity for 170 hr. The reaction pattern is shown in FIG. 1.

Activation under 100% H$_2$ resulted in more moderate activities for F39 and H41 (60-70% CO conversion) at low ROAD values, 0.024 for H41 and 0.031 for F39. The lower-temperature $H_2$ activation applied to AR64 (prepared according to Example 2F) resulted in low and declining activity as shown in Table 1 (F40, H46). Experiment H44, employing mild synthesis gas activation, gave moderate CO conversion with high ROAD value, 0.101.

Example 2K

Catalyst Testing: Long Time

Long-time catalytic testing experiments were run in slurry bed using a 1-Liter continuous stirred tank reactor (CSTR). Eight (8.0) grams of catalyst was slurried in 310.0 grams of C-30 oil. Table 2 summarizes activation and reaction conditions for a few representative runs. The runs were performed with the AR52 catalyst as described in Example 2B and with AR72 as described in Example 2I. Table 2 also presents the catalytic tests results in terms of percent CO conversion and its variation with time on stream (TOS). Catalyst activated under $H_2$ or $H_2$:CO of low or high ratio, had high activity and exhibited small rate of CO conversion decline ("ROAD"—Rate of Overall Activity Decline, % per hour).

Experiment 2 with $H_2$:CO ratio 0.7 gave excellent performance with CO conversion that declined from 92% to 84% over 360 h hence with a ROAD value of 0.026% per hour. Activity loss was higher with activation under 100% CO (Experiment 6 and 7) and under such conditions, AR72 showed higher activity retention compared to AR52.

Figure 2:
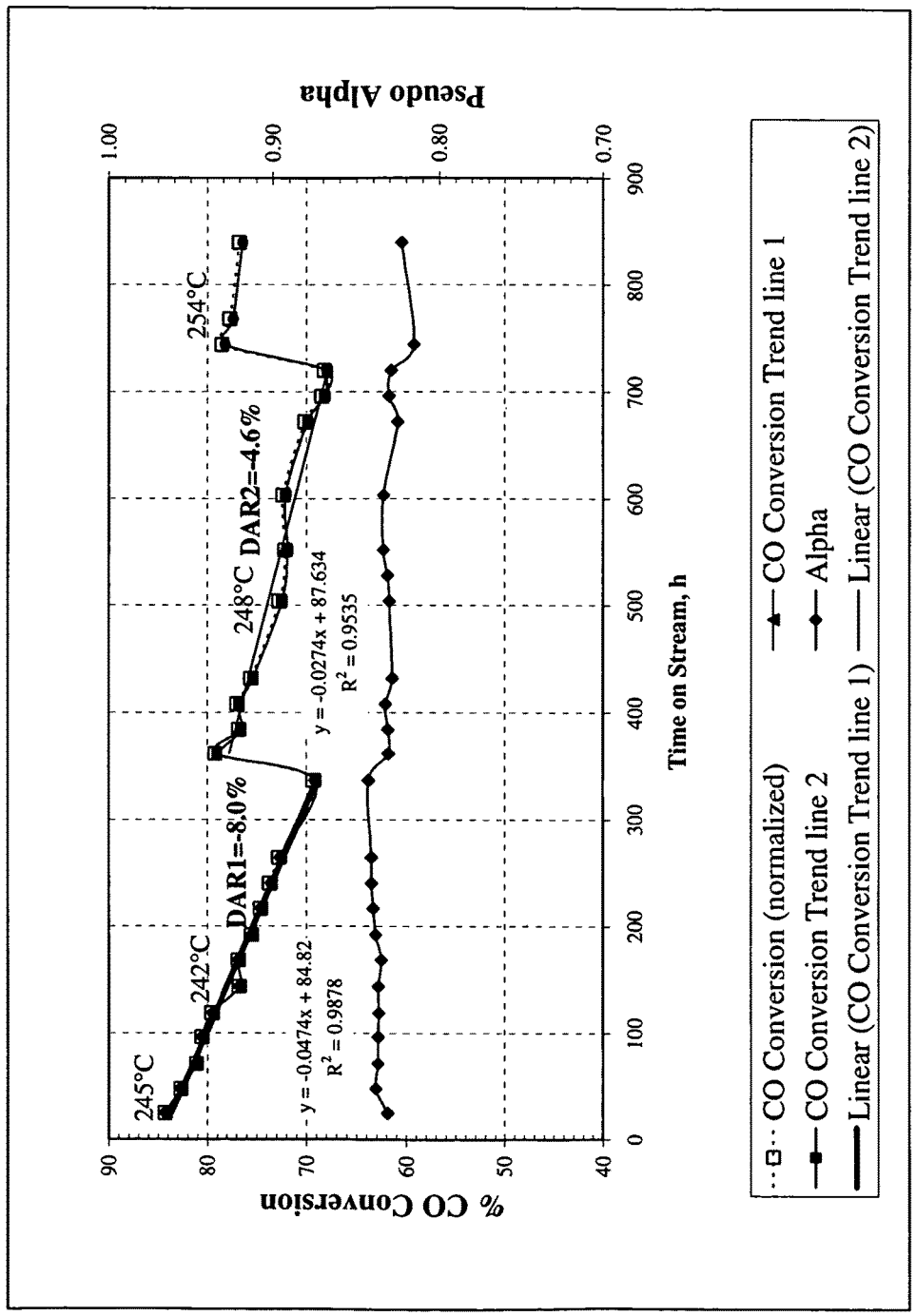
FIG. 2 is a plot CO conversion and Alpha as a function of time on stream; showing the long term catalytic performance of AR52-02.
Figure 3:
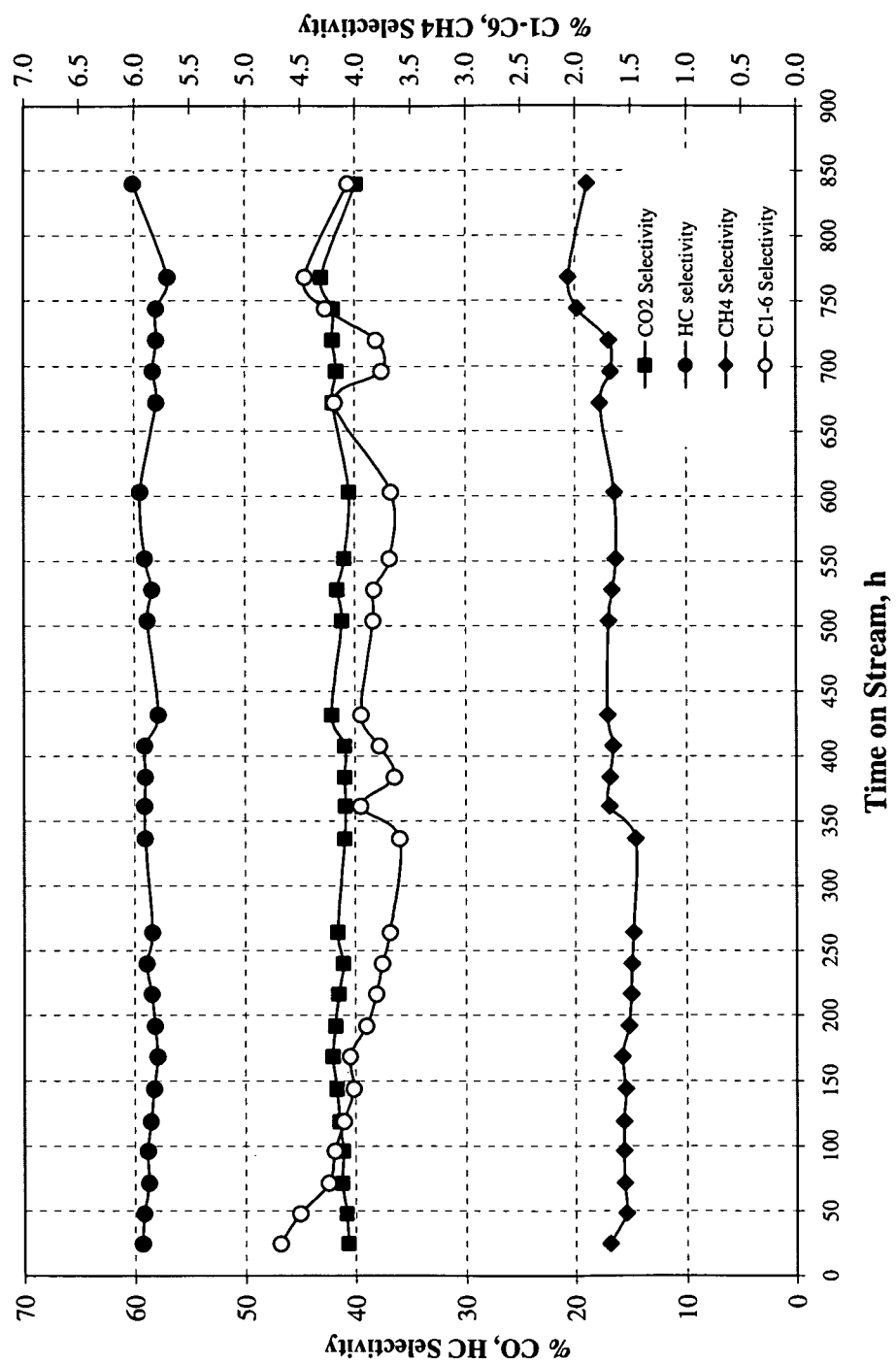
FIG. 3 is a plot of $CO_2$, $CH_4$, hydrocarbon, and $C_1$-$C_6$ selectivities as a function of time on stream, showing the long term catalytic performance of AR52-02.

For experiment 5, catalyst AR-52-09B1 was activated with syngas at a hydrogen to carbon monoxide ratio of 0.7. The temperature was ramped to 150° C. at a rate of 2° C./min, and from 150-270° C. at a rate of 0.5° C./min. Activation pressure was 30 psig, and the space velocity (SV) was 2.73 nl/h/g Fe. Activation conditions were maintained for 24 hours. Following activation, reaction was carried out at 242° C.-248° C., a pressure of 375 psig (2.027 slph $N_2$, 10.307 slph CO, 7.936 slph $H_2$), a space velocity of 3.57 nl/h/g Fe, and synthesis gas having a hydrogen to carbon monoxide ratio of 0.77. Experiment 5 demonstrates the potential advantage of starting the reaction at lower temperature, 245° C. compared to the "standard" 255° C., to limit the initial high activity, then adjusting the temperature, through gradual increase, to keep the activity from declining too fast. In this way, AR52 could give long productive life with 70% CO conversion still maintained after 670 hr on stream with ROAD=0.012% per hour. The average CO conversion (based on nitrogen balance) over the 670 hr TOS was 75%. This Experiment, B-306, is also described as a function of TOS in FIGS. 2 and 3. As seen in the Figures, the various selectivities over the entire period of the run are approximately constant: Alpha seems to have been declining somewhat when the temperature was increased, but $C_1$-$C_6$ hydrocarbon (HC) selectivity, methane selectivity and $CO_2$ selectivity are not substantially changed.

TABLE 2

| | AR Catalyst Testing - Long Time | | | | | | |
|---|---|---|---|---|---|---|---|
| | Experiment | | | | | | |
| | 1 | 2 | 3 | 4 | 5 | 6 | 7 |
| Run # | B-291 | B-292 | B-293 | B-294 | B-306 | B-307 | B-308 |
| Catalyst Code | AR52-09B1 | AR52-09B1 | AR52-09B1 | AR52-09B1 | AR52-09B1 | AR52-09B1 | AR72 |
| Activation | | | | | | | |
| Temperature, ° C. | 275 | 275 | 230 | 230 | 270 | 270 | 270 |
| Pressure, psig | 140 | 15 | 15 | 15 | 30 | 30 | 30 |
| Flow, slph | | | | | | | |
| Syngas | | 15.47 | 15.47 | 15.47 | | | |
| CO | 0 | | | | | 22.71 | 22.71 |
| $H_2$ | 15.47 | | | | | 0 | 0 |
| $N_2$ | 0 | 0 | 0 | 0 | 0 | 0 | 0 |
| $H_2$:CO ratio | | 0.7 | 10 | 0.7 | 0.7 | | |
| Space Velocity | 2.5 | 2.5 | 2.5 | 2.5 | 3.67 | 3.67 | 3.67 |
| Time, hr | 24 | 24 | 24 | 24 | 24 | 24 | 24 |
| Reaction | | | | | | | |
| Temperature, ° C. | 255 | 255 | 255 | 255 | 245-248 | 254 | 245 |
| Pressure, psig | 375 | 375 | 375 | 375 | 375 | 375 | 375 |
| Flow, slph | | | | | | | |
| $N_2$ | 2.101 | 2.101 | 2.101 | 2.101 | 2.027 | 2.027 | 2.027 |
| CO | 7.879 | 7.879 | 7.879 | 7.879 | 10.307 | 10.307 | 10.307 |
| $H_2$ | 11.03 | 11.03 | 11.3 | 11.03 | 7.936 | 7.936 | 7.936 |

TABLE 2-continued

AR Catalyst Testing - Long Time

| | Experiment | | | | | | |
|---|---|---|---|---|---|---|---|
| | 1 | 2 | 3 | 4 | 5 | 6 | 7 |
| $H_2$:CO ratio | 0.77 | 0.77 | 0.77 | 0.77 | 0.77 | 0.77 | 0.77 |
| Space Vel. | 3.45 | 3.45 | 3.45 | 3.45 | 3.54 | 3.54 | 3.54 |
| % CO Conversion at TOS (hr): | | | | | | | |
| 50 | 77 | 92 | 92 | 88 | 82 (245° C.) | 79 | 79 |
| 100 | 76 | 89 | 92 | 88 (stirrer stop) | 80 (242° C.) | 78 | 78 |
| 150 | 76 | 88 | 92 | 72 | 78 | 74 | 76 |
| 200 | 74 | 88 | 92 | 76 | 75 | 69 | 74 |
| 250 | 73 | 87 | 90 | 75 (240 hr) | 73 | 63 | 72 |
| 300 | 71 | 86 | 86 (285 hr) | | 71 | 59 | 70 |
| 350 | 70 (335 hr) | 84 (360 hr) | | | 73 (248° C.) | 56 (335 hr) | 67 |
| 400 | | | | | 77 | | 65 |
| 450 | | | | | 75 | | 61 |
| 500 | | | | | 73 | | |
| 550 | | | | | 72 | | |
| 600 | | | | | 72 | | |
| 650 | | | | | 71 | | |
| 700 | | | | | 70 (670 hr) | | |
| Rate of Overall Activity Decline (ROAD), %/hr | 0.024 | 0.026 | 0.025 | | 0.012 | 0.081 | 0.039 |

Example 3

Preparation of Coprecipitated Fe/Cu/MgAl$_2$O$_4$

Example 3A

Preparation of RSC-BD-15: Fe/Cu/K/MgAl$_2$O$_4$:100/1/1/100 by wt.

In step (1), Fe(NO$_3$)$_3$9H$_2$O (257.3 g), Cu(NO$_3$)$_2$3H$_2$O (1.4 g), Mg(NO$_3$)$_2$.6H$_2$O (64.1 g) and Al(NO$_3$)$_3$.9H$_2$O (187.6 g) were dissolved in 2000 mL DI water.

In step (2), the slurry was precipitated at 70° C. with 2000 mL of aqueous solution of Na$_2$CO$_3$ (207.8 g) under vigorous mixing. At the end of the precipitation, measured pH was 7.23 at 26.8° C.

In step (3), the precipitate was filtered and washed repeatedly with warm water until the pH was near neutral. Alternative methods can also be used to measure nitrates.

In step (4), after removal of excess water, 2.0 g of aqueous solution of K$_2$CO$_3$ (0.63 g) was added to the gelled slurry, and mixed thoroughly.

In step (5), the slurry was slowly dried and ground in a mortar using a pestle.

In step (6), the ground powder material was placed in an oven and first heated to 125° C. at the rate of 2° C./min, and then held at this temperature for 16 h. The dry powder was then heated to 350° C. at the ramp rate of 11/min, and kept at this calcination temperature for 16 h.

Example 3B

Preparation of RSC-BD-40: Fe/Cu/K/MgAl$_2$O$_4$:100/1/2/20 by wt.

In step (1), Fe(NO$_3$)$_3$.9H$_2$O (5145.9 g), Cu(NO$_3$)$_2$.3H$_2$O (27.1 g), Mg(NO$_3$)$_2$.6H$_2$O (256.4 g) and Al(NO$_3$)$_3$9H$_2$O (750.3 g) were dissolved in 2000 mL DI water.

In step (2), the slurry was then precipitated under vigorous mixing at 70° C. with 2000 mL of aqueous solution of Na$_2$CO$_3$ (2460.9 g). At the end of the precipitation, measured pH was 7.2 at 25° C.

In step (3), the precipitate was filtered and washed repeatedly with warm water until the pH was about neutral. Alternative methods can also be used to measure nitrates.

In step (5), after removal of excess water, the precipitate was dried slowly and ground in a mortar using a pestle.

In step (5), 100 g of aqueous solution of K$_2$CO$_3$ (25.2 g) was used to impregnate the dried material by mixing thoroughly.

In step (6), the ground powder material was placed in an oven and was first heated to 125° C. at a rate of 2° C./min, and held at this temperature for 8 h. The dry powder was then heated to 350° C. at a ramp rate of 11/min, and kept at this calcination temperature for 12 h.

Example 4

Preparation of Coprecipitated Fe/Cu/SiO$_2$ (RSC-BD-16)

A catalyst comprising Fe/Cu/K/SiO$_2$ in the ratios of 100/5/10/100 by wt. was prepared as follows.

In step (1), quantities of Fe(NO$_3$)$_3$.9H$_2$O (400.0 g) and Cu(NO$_3$)$_2$.3H$_2$O (10.5 g) were dissolved in 2000 mL DI water.

In step (2), tetraethyl orthosilicate (Si(OC$_2$H$_5$)$_4$, 191.7 g) was added to water and mixed for 24 hours. White cloudy jell-like solution was obtained at the end of this process.

In step (3), nitrate solutions obtained in step 1 and silica gel obtained in step 2 were mixed.

In step (4), the slurry obtained in step 3 was precipitated at room temperature with 2000 mL of aqueous solution of NH$_4$OH (236.2 g) under vigorous mixing. At the end of the precipitation, the measured pH was 7.2 at 25° C.

In step (5), the precipitate was filtered and washed with water repeatedly until pH was near neutral. Alternative methods can also be used to measure nitrates.

In step (6), after removal of excess water, the material obtained in step 5 was slowly dried and ground.

In step (7), the ground material obtained in step 6 was dried at 120° C. overnight.

In step (8), the material obtained in step 7 was impregnated with 25 mL of aqueous solution of K$_2$CO$_3$ (9.8 g) by incipient wetness method.

In step (9), the slurry was slowly dried and ground in a mortar using a pestle.

In step (10), the ground powder was placed in an oven and heated to 125° C. at the rate of 2° C./min, and held at this temperature for 12 h. The dry powder was then heated to 350° C. at the ramp rate of 11/min, and kept at this calcination temperature for 16 h.

Example 5

Preparation of Coprecipitated Fe/Cu/MgAl$_2$O$_4$—SiO$_2$ (RSC-BD-48)

A catalyst comprising Fe/Cu/K/MgAl$_2$O$_4$ in the ratios of 100/1/2/9.25 by wt. was prepared as follows.

In step (1), 1.1 g of tetraethyl orthosilicate, Si(OC$_2$H$_5$)$_4$, was mixed in 50 g of DI water for 24 h. A white cloudy gel-like solution was obtained.

In step (2), Fe(NO$_3$)$_3$.9H$_2$O (146.5 g), Cu(NO$_3$)$_2$.3H$_2$O (0.8 g), Mg(NO$_3$)$_2$.6H$_2$O (2.8 g) and Al(NO$_3$)$_3$.9H$_2$O (8.2 g) were dissolved in 750 mL of DI water.

In step (3), the gel-like solution obtained in step 1 was added into the nitrate solution obtained in step 2, and mixed thoroughly.

In step (4), the solution obtained in step 3 was precipitated at 28.4° C. with a base solution (comprising 61.5 g of Na$_2$CO$_3$ dissolved in 450 mL of DI water at 40° C.). The temperature of the solution reached 30° C. by the end of precipitation. The pH of the solution obtained was 5.4, and more Na$_2$CO$_3$ solution (6.25 g of Na$_2$CO$_3$ was dissolved in 100 mL of DI water) was added to the solution to bring the pH to 7.2. The final measured pH was 7.24 at 22° C.

In step (5), the precipitate was filtered through medium course filter paper and repeatedly washed with warm water until pH was about neutral. Alternative methods can also be used to measure nitrates.

In step (6), after removal of excess water, 10 g of aqueous solution of K$_2$CO$_3$ (0.7 g) was added to the slurry obtained in step 5, and vigorously mixed.

In step (7), the material obtained in step 6 was dried and ground in a mortar using a pestle.

In step (8), the dried ground material obtained in step 7 was first heated to 125° C. at a rate of 2° C./min, and held at this temperature for 5 h. The dry powder was then heated to 350° C. at a ramp rate of 11/min, and kept at this calcination temperature for 8 h.

Example 6

Settling Test

A settling test was performed to compare IC BD-31 with the baseline air-classified unstrengthened precipitated unsupported catalyst. The catalysts were activated under identical conditions. Typhoon activation method was used to activate the catalyst; 'typhoon' activation comprised: heating the catalyst to 275° C. in nitrogen, once a temperature of 275° C. was attained, syngas was fed at a H$_2$:CO ratio of 1.4, an activation temperature of 275° C., operation under 140 psig pressure, and activation for 4-24 hours depending on the space velocity. Activated catalyst was operated at run conditions for 15 hours.

Cross-sections of the wax removed from the autoclave were used to compare the separation of the catalyst from wax. The IC catalyst settled as a thin line in the wax. The wax above the baseline precipitated unsupported catalyst was of a darker-color than the brown-colored wax above the settled IC BD-31 catalyst, indicating better separation of the IC catalyst from the wax.

An additional settling test was run using oil rather than wax. An activated IC catalyst and an activated precipitated unsupported catalyst, both in oil, were allowed to settle for 24 hours. Comparative settling showed that more catalyst settled in the bottom of the bottle when the catalyst with structural promoter was used. The precipitated unsupported catalyst did not settle as much to the bottom of the oil as the IC in 24 hours.

Example 7

Autoclave and SBCR Tests

ICs were activated and tested in autoclave under identical conditions. For autoclave tests, 25 g of catalyst was added to 300 grams of Dussek Campbell wax and tested in an autoclave. Fresh catalyst was activated by Typhoon method described in Example 6 hereinabove prior to the test. Autoclave activation conditions comprised activation temperature of 275° C.; activation pressure of 140 psig and H$_2$:CO ratio of 1.4; space velocity during activation: 2.5 NL/gFe/h. Autoclave reaction conditions comprised reaction temperature of 255° C., reaction pressure of 375 psig; H$_2$:CO ratio of 0.77, and space velocity of 3.45 NL/gFe/h (NL=normal liter).

For SBCR tests, seven hundred (700) grams of IC prepared as in Example 1 were mixed with 3,000 grams of Dussek Campbell wax and added to a 1.5-inch diameter by 26-ft. tall SBCR. Run parameters are listed in Tables 3 and 4.

Results from autoclave tests performed on several ICs as well as on the baseline (RI) precipitated unsupported catalyst are summarized in Tables 3 and 4. As can be seen from Tests #16 and 17 in Table 3, the performance of IC BD-31 exhibited comparable chain growth (measured by alpha which is indicative of the average molecular weight of the liquid products produced) and a somewhat lower CO conversion compared with the baseline precipitated unsupported catalyst. NLPH is "normalized liters per hour." Normal conditions of temperature and pressure are defined as 0° C. and 1 atm.

"Single α" refers to a pseudo-alpha chain growth parameter predicted based on calculations. Using GCMS data, single alpha was predicted using the average with the light products (hydrogen, methane, CO, and CO$_2$) included.

Pseudo-alpha is predicted based on the assumptions that only hydrocarbons and water are produced in the FT reaction and that the hydrocarbon distribution obeys the Anderson-Schultz-Flory carbon number distribution having a single chain-growth parameter, $\alpha$. Although the single chain-growth parameter may not give a good representation of the carbon number distribution for an FT reaction, the $\alpha$ values determined by this method can be used to compare wax-producing tendencies of a catalyst at changing operating conditions and for comparing catalysts under the same operating conditions.

TABLE 3

Autoclave and SBCR Test Results

| Test | Reactor | Catalyst | Space Velocity, NLPH/g Fe | Pressure, Psig | Temp, °C. | $H_2$:CO | CO Conversion, % | Single Alpha |
|---|---|---|---|---|---|---|---|---|
| 1 | SBCR | RI | 3.48 | 343 | 248 | 1.60 | 0.88 | 0.86 |
| 2 | CSTR | RI | 4.55 | 330 | 255 | 1.60 | 0.70[1] | 0.84 |
| 3 | SBCR | RI | 3.48 | 394 | 255 | 0.77 | 0.60 | 0.88 |
| 4 | CSTR | RI | 4.32 | 430 | 255 | 0.77 | 0.53[2] | 0.88 |
| 7 | CSTR | RSC-BD-18 | 3.79 | 375 | 255 | 1.60 | 0.53 | 0.80 |
| 8 | CSTR | RSC-BD-18 | 3.79 | 375 | 260 | 1.60 | 0.60 | 0.80 |
| 9 | CSTR | RSC-BD-18 | 3.79 | 375 | 260 | 0.77 | 0.32 | 0.85 |
| 10 | CSTR | RSC-BD-30 | 3.79 | 375 | 275 | 1.40 | 0.90 | 0.80 |
| 11 | CSTR | RSC-BD-30 | 3.79 | 375 | 260 | 1.40 | 0.80 | 0.79 |
| 12 | CSTR | RSC-BD-30 | 3.79 | 375 | 255 | 1.60 | 0.60 | 0.84 |
| 13 | CSTR | RSC-BD-30 | 3.79 | 375 | 260 | 1.60 | 0.67 | 0.81 |
| 14 | CSTR | BD-30 | 3.79 | 375 | 260 | 0.77 | 0.42 | 0.85 |
| 15 | CSTR | RSC-BD-30 | 3.79 | 430 | 260 | 0.77 | 0.47 | 0.85 |
| 16 | CSTR | RSC-BD-31 | 3.80 | 375 | 260 | 0.77 | 0.67 | 0.88 |
| 17 | CSTR | RI | 3.80 | 375 | 260 | 0.77 | 0.83 | 0.88 |

[1]91.5% if adjusted for SV
[2]65.8% if adjusted for SV

TABLE 4

Autoclave and SBCR Test Results

| Test # | Reactor and Run # | Catalyst | Time on Stream[1], h | S.V., Nl/h · gFe | P, psig | T, °C | $H_2$:CO | CO Conversion, % | Single $\alpha$ | Catalyst + Wax Burndown[2], % |
|---|---|---|---|---|---|---|---|---|---|---|
| 1 | CSTR A-07-22-02 | RSC-BD-22 10% $SiO_2$, act. @ $H_2$:CO = 0.67 | 103.39 | 4.7 | 330 | 260 | 0.67 | 25 | 0.81 | 0.15 |
|  |  |  |  | 4.7 | 330 | 260 | 1.4 | 43 | 0.77 |  |
|  |  |  |  | 4.7 | 330 | 260 | 1.6 | 42 | 0.79 |  |
|  |  |  |  | 3 | 330 | 260 | 1.4 | 53 | 0.77 |  |
|  |  |  |  | 3 | 330 | 260 | 0.67 | 34 | 0.82 |  |
| 2 | CSTR A-07-29-02 | RSC-BD-22 10% $SiO_2$, act. @ $H_2$:CO = 1.4 | 83.52 | 4.7 | 330 | 260 | 1.6 | 69 | 0.67 | 0.44 |
|  |  |  |  | 4.1 | 330 | 260 | 1.6 | 71 | 0.67 |  |
|  |  |  |  | 4.1 | 330 | 255 | 1.6 | 70 | 0.69 |  |
|  |  |  |  | 3 | 330 | 255 | 1.6 | 74 | 0.67 |  |
|  |  |  |  | 3 | 330 | 260 | 1.6 | 77 | 0.67 |  |
| 3 | CSTR A-08-02-02 | RSC-BD-18 2.2% $SiO_2$, act. @ $H_2$:CO = 1.4 | 75.35 | 3.8 | 375 | 255 | 1.6 | 53 | 0.81 | 0.52 |
|  |  |  |  | 3.8 | 375 | 260 | 1.6 | 60 | 0.805 |  |
|  |  |  |  | 3.8 | 375 | 260 | 0.77 | 34 | 0.86 |  |
| 4 | CSTR A-08-16-02 | RSC-BD-30 1.6% $SiO_2$, act. @ $H_2$:CO = 1.4 | 107.53 | 2.6 | 375 | 260 | 1.4 | 79 | 0.8 | — |
|  |  |  |  | 3.8 | 375 | 255 | 1.6 | 60 | 0.84 |  |
|  |  |  |  | 3.8 | 375 | 260 | 1.6 | 68 | 0.81 |  |
|  |  |  |  | 3.8 | 375 | 260 | 0.77 | 43 | 0.87 |  |
|  |  |  |  | 3.8 | 430 | 260 | 0.77 | 48 | 0.87 |  |
| 5 | CSTR A-08-24-02 | RSC-BD-30 1.6% $SiO_2$, act. @ $H_2$:CO = 1.4 | 18.15 | 3.8 | 375 | 260 | 0.77 | 50 | 0.87 | 0.35 |
| 6 | CSTR A-08-22-02 | RSC-BD-31 1% $SiO_2$, act. @ $H_2$:CO = 1.4 | 14.13 | 3.8 | 375 | 260 | 0.77 | 67 | 0.87 | 0.23 |
| 7 | CSTR A-08-27-02-2 | RI no$SiO_2$, act. @ $H_2$:CO = 1.4 | 64.36 | 3.8 | 375 | 260 | 0.77 | 75 | 0.87 | 1.07[3] |
|  |  |  |  | 3.8 | 375 | 255 | 0.77 | 68.5 | 0.88 |  |
| 11 | SBCR RI74ia (activation only) | RI | 3 | 1.68/0.68 | 142 | 269 | 1.4 | 94 | 0.85 | 0.36[4] |
| 12 | SBCR RI76 | RSC-BD-31- | 205.44 | 2.39 | 438 | 255 | 0.77 | 55 | 0.88 | — |

TABLE 4-continued

Autoclave and SBCR Test Results

| Test # | Reactor and Run # | Catalyst | Time on Stream[1], h | S.V., Nl/h · gFe | P, psig | T, °C. | H$_2$:CO | CO Conversion, % | Single α | Catalyst + Wax Burndown[2], % |
|---|---|---|---|---|---|---|---|---|---|---|
| 13 | CSTR A-09-10-02 | 1% SiO$_2$; act. @ H$_2$:CO = 1.4 (Same catalyst used for SBCR and CSTR tests) | 218.96 | 2.39 | 438 | 255 | 0.77 | 60 | 0.865 | — |

[1]Including activation time.
[2]Catalyst + Wax slurry burnt down to determine % catalyst in slurry; sampled from top portion except Test # 11.
[3]Determined by using the slurry from replicate Run # A-08-23-02.
[4]From SBCR settler bottom portion.

From Tables 3 and 4, it is clear that high levels of silica (~10 wt %) have a large negative effect on chain growth in particular. The data also suggest that low levels of silica (less than about 3 wt %) may impart improved strength to the iron catalyst without a large penalty on activity and selectivity.

Figure 4:
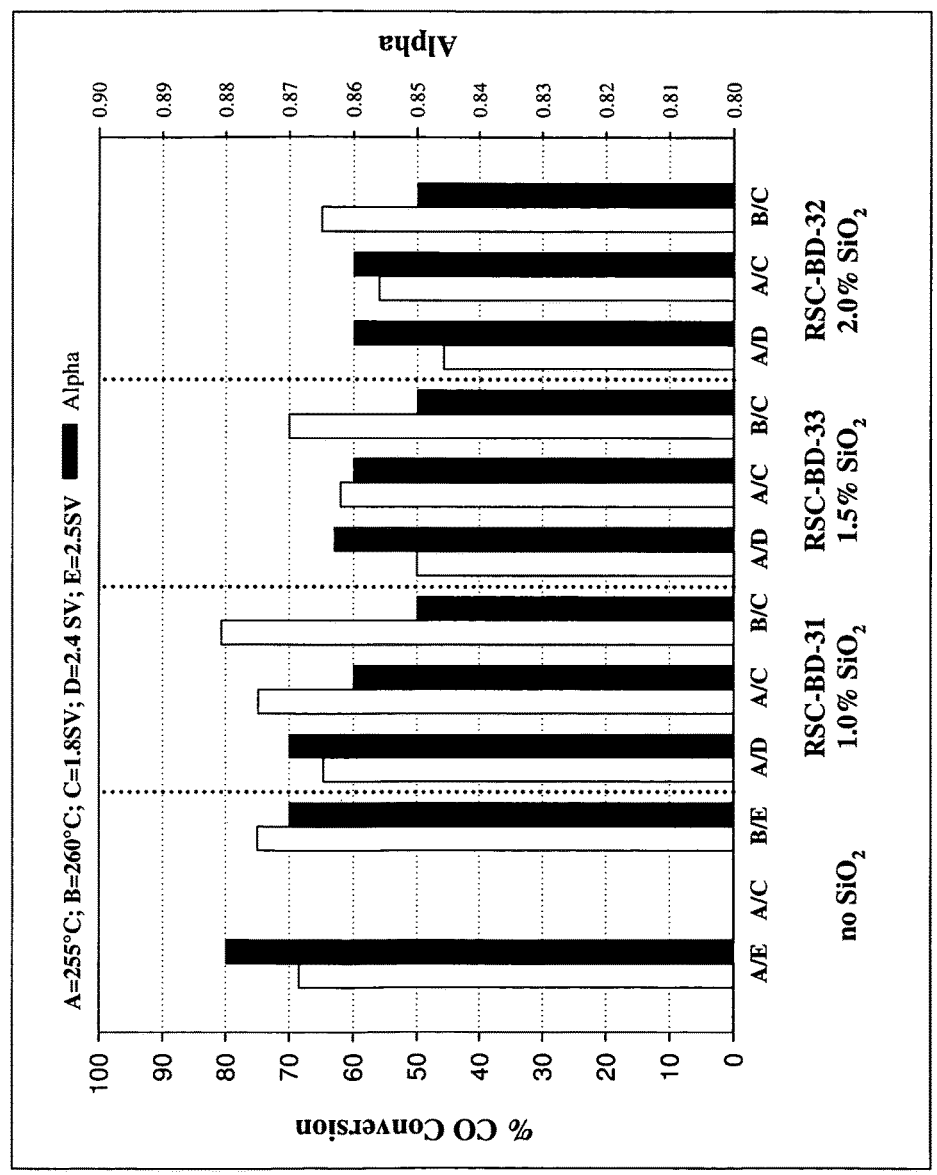
FIG. 4 is a plot of percent CO conversion and alpha for the precipitated unsupported catalyst and several ICs.

It appears that a silica content of 10 wt % is too high for good activity and wax selectivity. It also appears that a silica content in the 1 wt % to 3 wt % range might impart sufficient strength and long life to the baseline unstrengthened catalyst, e.g. compare run numbers 6 and 7 of Table 4. Although activity will be reduced slightly, this may be compensated by a slight reduction in space velocity. Measured CO conversion and chain growth parameter (alpha; α) for ICs are compared in FIG. 4. FIG. 4 is a plot of percent CO conversion and alpha for the precipitated unsupported catalyst and several ICs. It appears that CO conversion for the 1% SiO$_2$ IC can exceed that of the baseline precipitated unsupported catalyst if the space velocity is reduced from 2.4 to 1.8.

Figure 5:
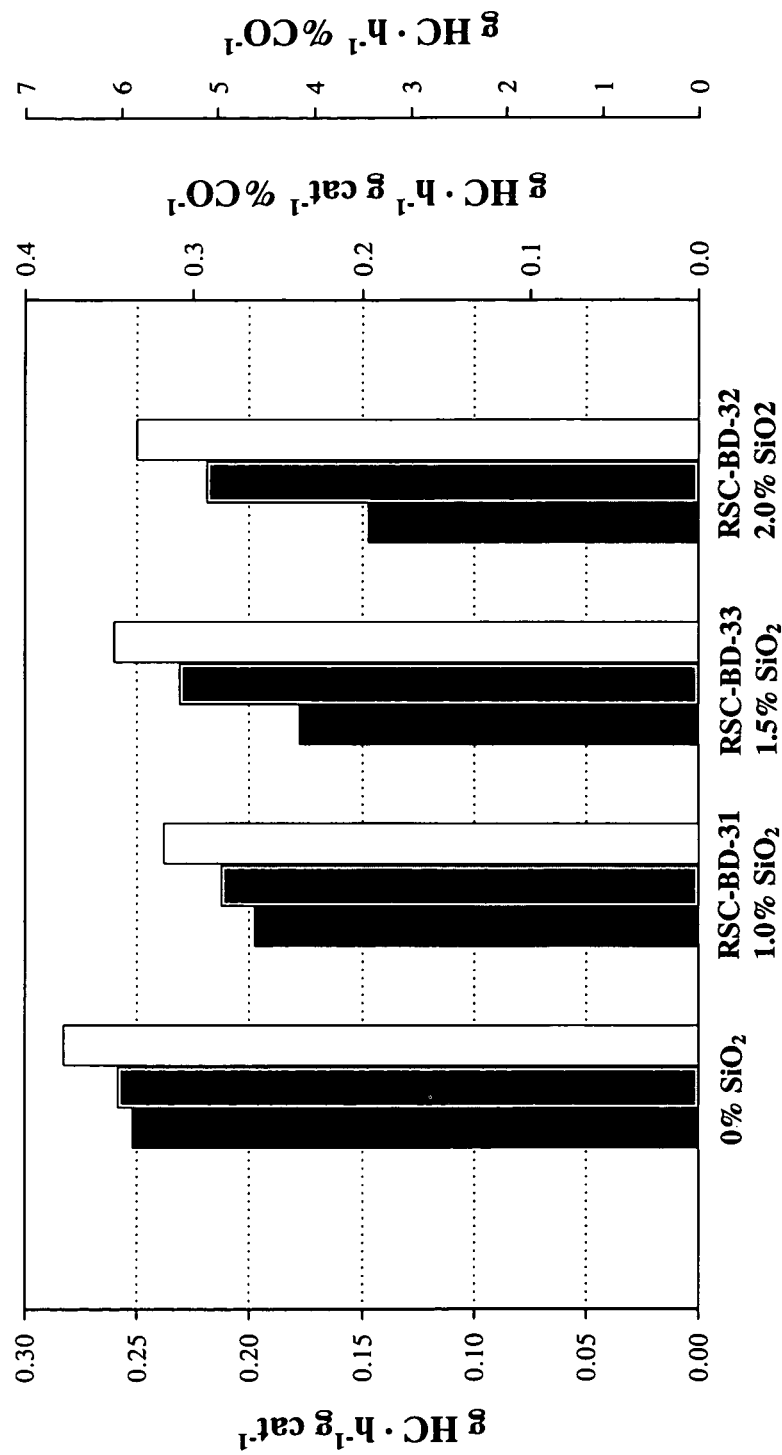
FIG. 5 is a bar graph of hydrocarbon collected in autoclave runs using different parameters.

Although alpha appears lower for the 1% SiO$_2$ IC than for the baseline precipitated unsupported catalyst, productivity is comparable. Comparisons using various performance parameters for the ICs and baseline catalysts at 255° C. are shown in FIG. 5. FIG. 5 is a bar graph of hydrocarbon collected in autoclave runs using different parameters. The first bar graph in each series shows the rate of hydrocarbon collected divided by the grams of catalyst. Since the amount of catalyst was about 20 grams for each test, the chart shows that the rate of hydrocarbon collected decreased with amount of silica added. The differences can be attributed to CO conversion or alpha or both. The second bar removes the effect of CO conversion also and shows that the catalysts containing 1.5% and 2.0% silica yielded more collectible hydrocarbons than the catalyst containing 1.0% silica. The same trends are observed in the third bars which have the catalyst weight removed from the denominator. This means that an increase in CO conversion that results from reduced space velocity in the silica catalyst will also mean hydrocarbon production.

Figure 6:
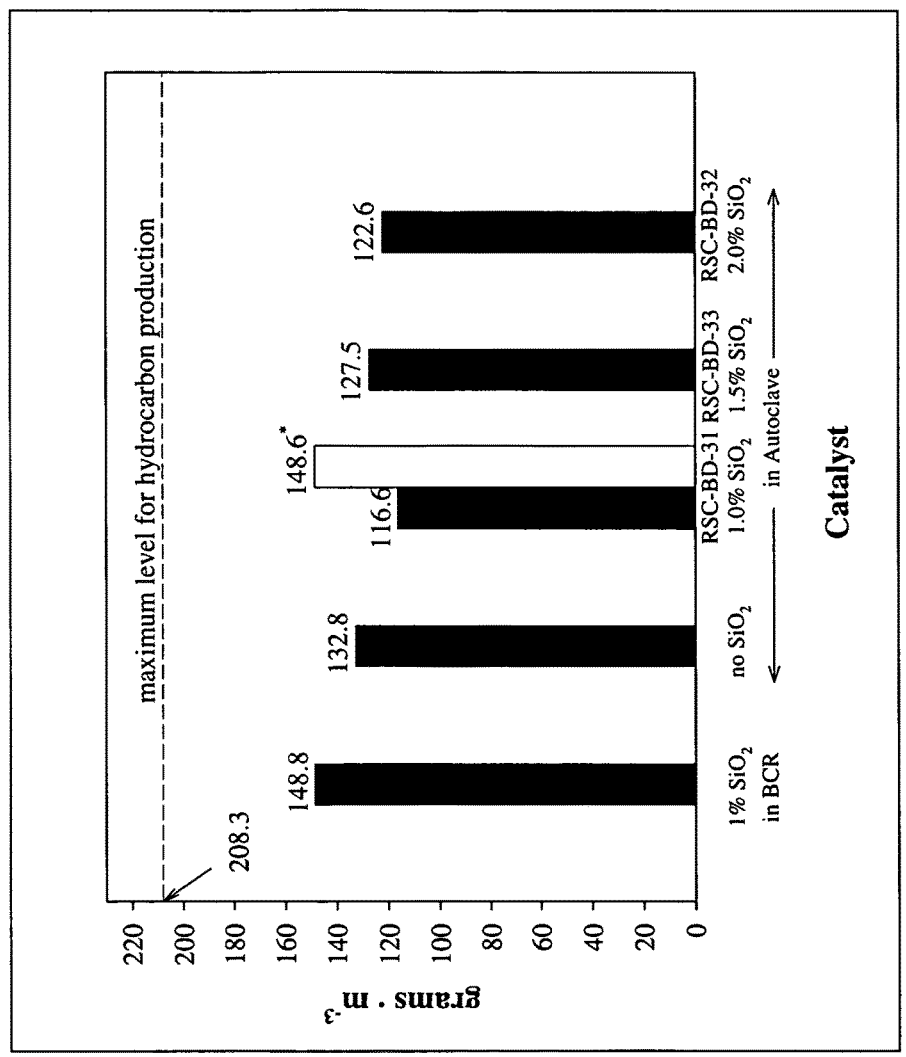
FIG. 6 is a plot of the grams of collected hydrocarbons per cubic meter of synthesis gases reacted for various IC and baseline catalysts.

FIG. 6 is a plot showing the grams of collected hydrocarbons per cubic meter of synthesis gases reacted for various IC and baseline catalysts. The horizontal line at 208.3 g/m$^3$ represents the maximum possible amount of C1$^+$ hydrocarbons produced when only hydrocarbons are considered (no alcohols, acids, etc.). The 208.3 g/m$^3$ maximum value is true regardless of the relative amount of H$_2$ and CO reacted. Consider the following reaction which combines the FT and water gas shift (WGS) reactions:

$$vH_2+CO \rightarrow \alpha CH_2+\beta CO_2+\gamma H_2O \quad (1)$$

where, $\alpha=(1+v)/3$; $\beta=(2-v)/3$; and $\gamma=(2v-1)/3$.

The amount of hydrocarbons produced is 14 (1+v)/3 grams. The amount of syngas reacted is 0.0224(1+v) in units of m$^3$. Therefore, the grams per m$^3$ is 14/3/0.0224=208.3. The hydrocarbons collected using the unstrengthened baseline precipitated unsupported catalyst (RI) was 63.8% (132.8/208.3*100%) of the maximum produced. This compares with 61.2% (127.5/208.3*100%) for IC RSC-BD-33. It should be noted that the SBCR test of IC with 1% SiO$_2$ gives 71.4% (148.8/208.3*100%) of the maximum produced.

The results show that while silica may improve the catalyst strength, it can also reduce the activity and alpha of the catalyst. Alpha is 0.863 for IC RSC-BD-33 compared to 0.88 for the baseline precipitated unsupported catalyst. However, when the difference in CO conversion is accounted for, IC RSC-BD-33 produced only about 10.7% less collectible hydrocarbons than the baseline precipitated unsupported catalyst. On the same basis, IC RSC-BD-32 containing 2.0% silica gave about 15.4% less collectible hydrocarbons.

Example 8

Attrition Rig Tests

Figure 7:
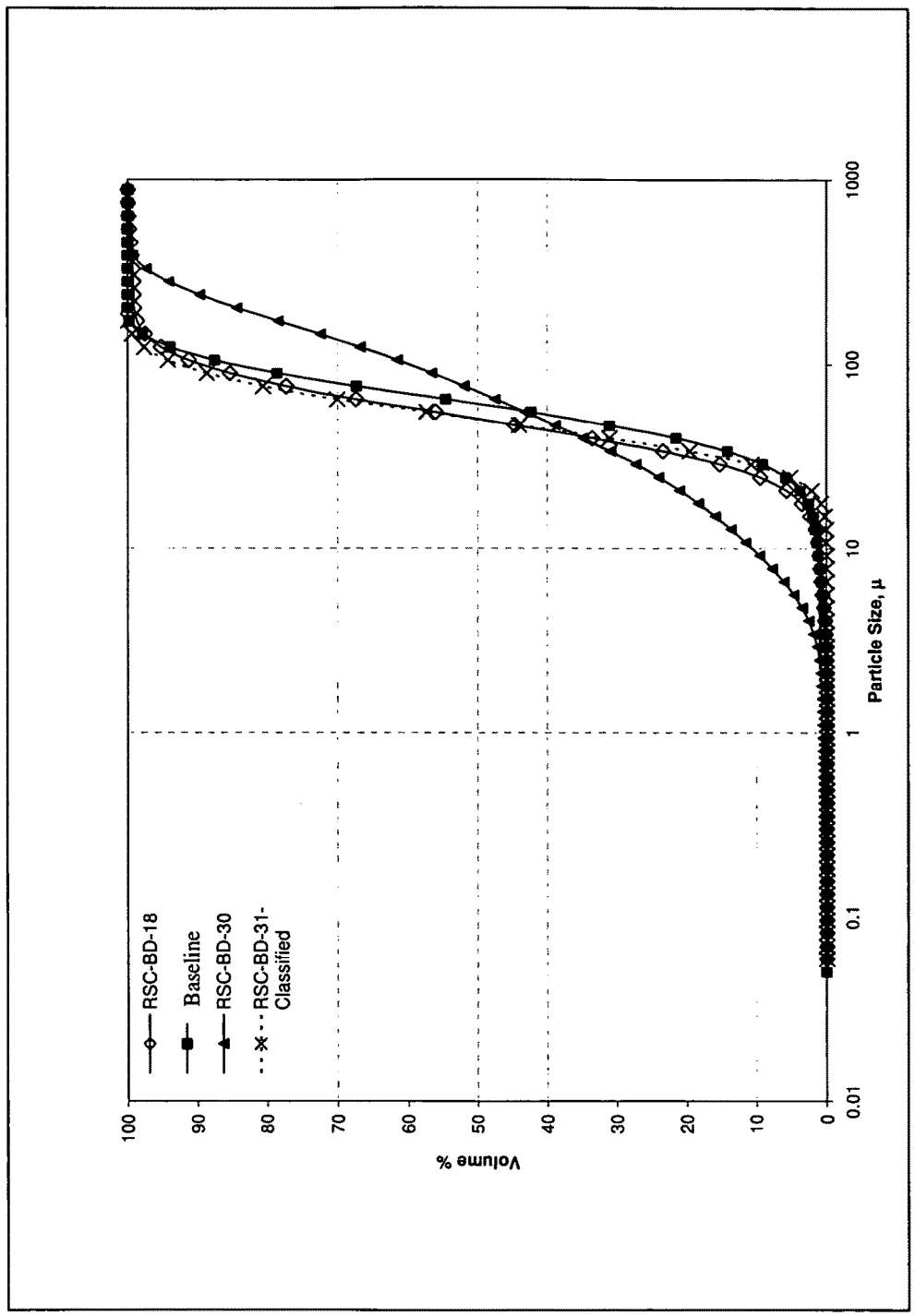
FIG. 7 is a cumulative particle size distribution or PSD plot of ICs RSC-BD-18, RSC-BD-31, and RSC-BD 30 comprising 2.2 wt %, 1.0 wt %, and 1.6 wt % silica respectively.
Figure 8:
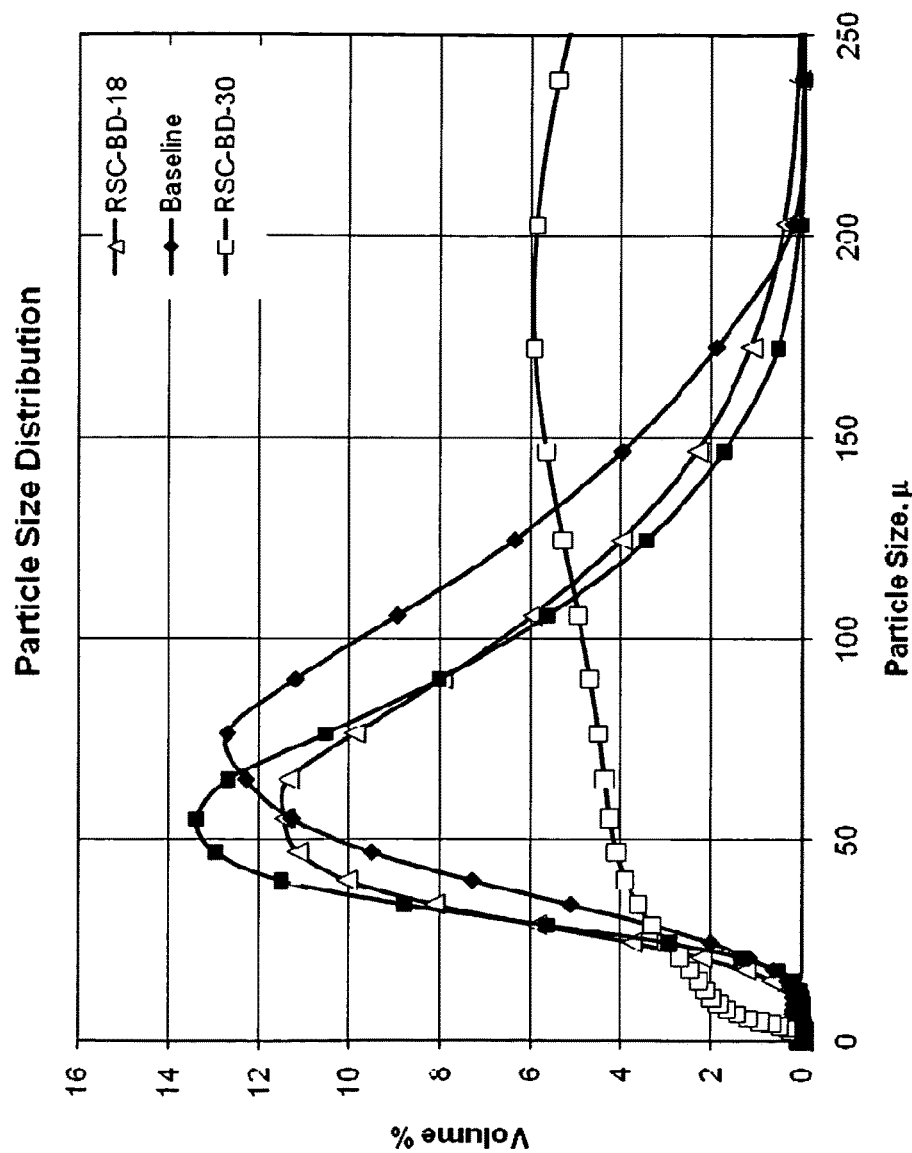
FIG. 8 is a PSD plot for the ICs and precipitated unsupported catalysts of FIG. 9.

Oil/catalyst samples were also tested in an attrition rig to determine relative attrition resistance. Fresh batches of the catalysts in oil were activated in the autoclave. The oil-activated catalysts were tested in an attrition rig which simulates a slurry bubble column reactor and operating conditions in SBCR. Particle size distributions (PSDs) were measured for fresh catalysts as well as upon attrition for 2 min, 12 h, 36 h, 84 h, and 180 h. FIG. 7 is a cumulative particle size distribution plot of ICs RSC-BD-18, RSC-BD-31, and RSC-BD 30 comprising 2.2 wt %, 1.0 wt %, and 1.6 wt % silica respectively. Included for comparison are cumulative PSDs of baseline precipitated unsupported catalysts. FIG. 8 is a PSD plot of the ICs and precipitated unsupported catalysts of FIG. 7. As can be seen from FIGS. 7 and 8, the particle size distributions of the ICs are comparable to those of the baseline unstrengthened catalysts. The ICs RSD-BD-30 and 31 had comparable PSD to baseline catalyst considering they were prepared by impregnation of baseline catalyst using potassium silicate. This was expected because the baseline catalyst underwent some attrition during the impregnation process. Separation of the IC catalysts from wax was, however, better than separation of the baseline catalyst from wax.

Figure 9:
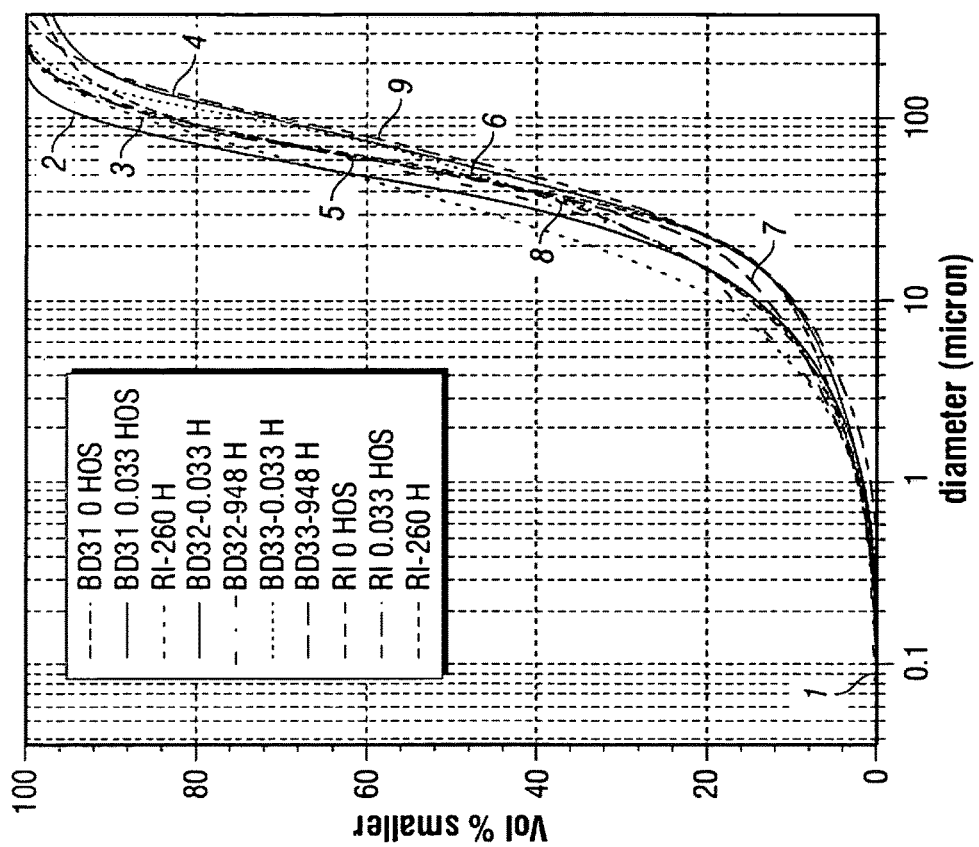
FIG. 9 is a cumulative PSD plot for samples taken during attrition tests of ICs RSC-BD-31, RSC-BD-32 and RSC-BD-33 comprising 1.0 wt %, 2.0 wt %, and 1.5 wt % silica respectively.

FIG. 9 is a cumulative PSD of samples taken during attrition tests of ICs RSC-BD-31, RSC-BD-32 and RSC-BD 33 comprising 1.0 wt %, 2.0 wt %, and 1.5 wt % silica respectively. The volume percent smaller refers to the cumulative percentage of the particles below a certain size. For example, in FIG. 9, 50% of the RI-260 h particles are 33 microns and smaller. Attrition results for precipitated unsupported catalyst RI are included for comparison. The results show that at the end of 948 hours of attrition tests, the inventive catalysts RSC-BD-31, RSC-BD-32, and RSC-BD-33, break down less than the baseline RI catalyst.

As mentioned in paragraph [0087] hereinabove, chemical attrition indices were defined as the difference in the percentage of particles above a certain size before and after activation divided by the percentage of particles above that size after activation. The PSD before and after catalyst activation in the attrition rig was used to determine the cumulative amount of particles above 10 micrometers and above 20 micrometers before and after activation. These PSDs were used to calculate the CAI-10 and the CAI-20 of various ICs of this disclosure. For example, Table 5 shows the CAI-10 and the CAI-20 of unsupported catalyst (based on U.S. Pat. No. 5,504,118), along with the CAI values of a catalyst of Example 2 and an IC according to Example 10 hereinbelow.

TABLE 5

| | Catalyst | |
|---|---|---|
| | CAI-10 | CAI-20 |
| Unsupported Catalyst | 50.7 | 67.2 |
| IC RSC-BD-48, as in Example 5 | 2.6 | 1.9 |
| Typical IC formed by addition of silica following precipitation of catalyst material, as in Example 2 | 3.3 | 7.1 |

The chemical attrition index CAI-10 of the inventive catalysts, IC, is reduced 15.4-19.5 times using the numbers for CAI-10. The chemical attrition index CAI-20 of the inventive catalysts, IC, is reduced 9.5-35 times using the numbers for CAI-20.

Example 9

Separation of Catalyst from Product Mixture

In order to determine how much iron is in the wax, one of the methods used is the burn-down test in which catalyst+wax sample (a known amount) is placed in an oven at 600° C. for a period of a few hours. The solid particles remaining in a stainless steel beaker were weighed to calculate how much iron was in the wax. The last column of Table 4 is the percentage of catalyst ($Fe_2O_3$) in the slurry (catalyst+wax) after burndown (ashing the sample slurry).

Burn-down tests are a quick way to determine the amount of catalyst in the wax that did not settle to the bottom at the end of CSTR tests. Inductive coupled plasma (ICP) is a more accurate method that may be used to measure the amount of catalyst in wax. The results show that all ICs can be separated from the wax better than precipitated unsupported catalysts based on the percent catalyst in the wax determined from burn-down of catalyst in the wax that did not settle. The amount of precipitated unsupported catalyst used in Test 11 showed 1.07% catalyst in the wax whereas all ICs showed less than 0.5% catalyst in wax. (It should be noted that the percent catalyst in wax in Test 12 appears low (0.36%) because the test was only for activation.)

Example 10

Magnesium Aluminate Supported Catalyst

Catalysts comprising magnesium aluminate as support were prepared as described in Examples 3 and 5 hereinabove. IC RSC-BD-40, as described in Example 3B hereinabove, was formed by coprecipitation of Fe, Cu, Mg, and Al. IC RSC-BD-48, as described in Example 5 hereinabove, was formed by coprecipitation of Fe, Cu, Mg, Al and Si. Attrition resistance of the ICs RSC-BD-40 and RSC-BD-48 comprising $MgAl_2O_4$ were tested in autoclave and tested for attrition resistance.

Figure 10:
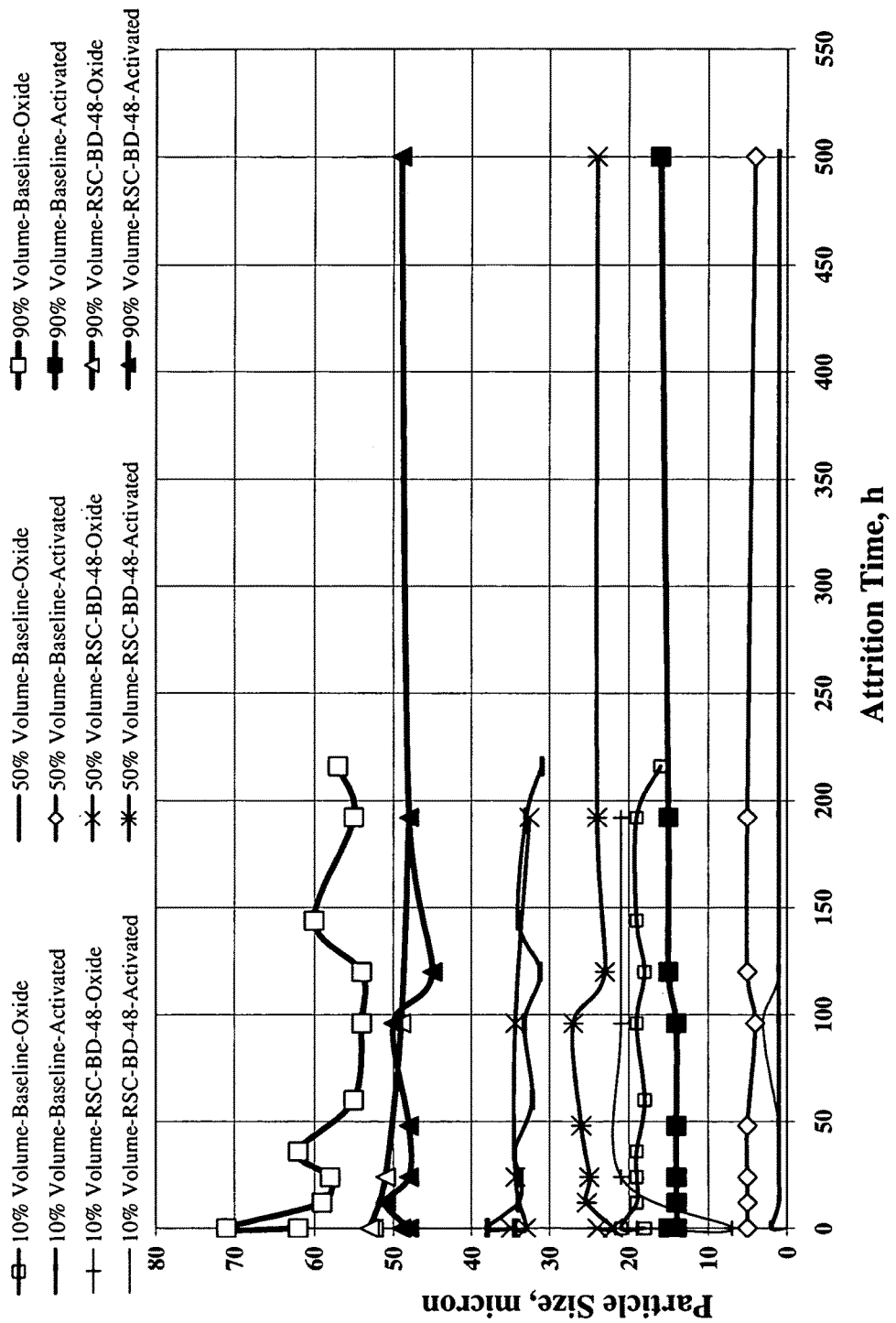
FIG. 10 is a plot of catalyst particle size as a function of attrition time for precipitated unsupported oxide catalyst as well as for magnesium aluminate catalyst IC RSC-BD-48.

FIG. 10 is a plot of catalyst particle size as a function of attrition time for precipitated unsupported oxide catalyst as well as for IC RSC-BD-48. The volume percent smaller, e.g. 10% volume, 50% volume, or 90% volume in FIG. 10, refers to the cumulative percentage of the particles below a certain size. From FIG. 10 it is clear that 10, 50 and 90% of the RSC-BD-48 catalyst have much lower particle size than the corresponding baseline precipitated unsupported catalyst. Fresh baseline catalyst precursor in oxide form went through more attrition compared with IC RSC-BD-48. The change in particle size for 90% of baseline catalyst was very significant. The particle size of fresh oxide catalyst precursor was ~62 micron, and that decreased to ~15 micron when it was activated. However, the change in particle size for RSC-BD-48 was not that significant: it only changed from 52 μm to 49 μm upon activation. RSC-BD-48 also exhibited less attrition over time.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for preparing an iron catalyst to be used in a Fischer-Tropsch slurry reactor, the method comprising:
preparing a solution comprising ferrous and ferric nitrates, copper nitrate, and at least one of aluminum nitrates and magnesium nitrate by dissolving iron, copper, and at least one of magnesium and aluminum in nitric acid, precipitating a catalyst precursor comprising at least one of iron hydroxides and iron carbonates, by combining the solution with a base;

contacting the catalyst precursor with a promoter comprising potassium and a structural promoter selected from the group consisting of potassium silicate, colloidal silica, TEOS, and polysilicic acid, to yield a promoted precursor, wherein the catalyst precursor is contacted with the promoter and the structural promoter by adding the promoter and the structural promoter to a slurry comprising the catalyst precursor;

drying the promoted precursor to yield dried catalyst, wherein the dried catalyst comprises from about 1 wt % $SiO_2$ to about 2.2 wt % $SiO_2$; and calcining the dried catalyst.

2. The method of claim 1 wherein contacting the catalyst precursor with a promoter comprises contacting the catalyst precursor with an amount of potassium carbonate sufficient to promote the catalyst with potassium.

3. The method of claim 1 wherein the catalyst precursor further comprises copper oxide.

4. The method of claim 1 wherein contacting the catalyst precursor with a promoter comprises contacting the catalyst precursor with copper nitrate.

5. The method of claim 1 wherein the structural promoter comprises potassium silicate.

6. The method of claim 5 wherein the potassium silicate is an aqueous solution.

7. The method of claim 1 wherein the catalyst comprises about 1 wt % copper and about 1 wt % potassium.

8. The method of claim 1 wherein the structural promoter comprises TEOS.

9. The method of claim 1 wherein the structural promoter is colloidal silica.

10. The method of claim 9 wherein the silica is silica sol.

11. The method of claim 10 wherein the catalyst has an Fe: $SiO_2$ mass ratio of between about 100:1 and about 100:8.

12. The method of claim 11 wherein the Fe: $SiO_2$ mass ratio is about 100:5.

13. The method of claim 11 wherein the catalyst has an Fe:Cu:K:$SiO_2$ mass ratio of about 100:4:3:5.

14. The method of claim 11 wherein the Fe:Cu:K:$SiO_2$ mass ratio is about 100:3:3:5.

15. The method of claim 1 wherein the Fe:Cu mass ratio is between about 100:1 and 100:7.

16. The method of claim 15 wherein the Fe:Cu mass ratio is about 100:4.

17. The method of claim 1 wherein the promoter comprises potassium and wherein the Fe:K mass ratio of the iron catalyst is in the range of from about 100:1 to about 100:5.

18. The method of claim 17 wherein the Fe:K mass ratio is about 100:3.

19. The method of claim 1 wherein precipitating is performed at a pH in the range of from about 7.2 to about 7.4.

20. The method of claim 1 wherein the base is selected from the group consisting of ammonium hydroxide and sodium carbonate.

21. The method of claim 20 wherein the base comprises about 14.5 wt % aqueous ammonium hydroxide.

22. The method of claim 1 further comprising spray drying the catalyst prior to, subsequent to, or both prior to and subsequent to combining the promoted precursor with the structural promoter.

23. The method of claim 22 further comprising calcining the iron catalyst.

24. A method for preparing an iron catalyst to be used in a Fischer-Tropsch slurry reactor, the method comprising:

precipitating a catalyst precursor from a solution comprising an iron salt, and a copper salt, and at least one of aluminum salts and magnesium salts;

promoting the catalyst precursor by adding potassium carbonate and a structural promoter to a slurry comprising the catalyst precursor, wherein the structural promoter is selected from the group consisting of potassium silicate, colloidal silica, TEOS, and polysilicic acid;

drying to yield dried catalyst, wherein the dried catalyst comprises from about 1 wt % $SiO_2$ to about 2.2 wt % $SiO_2$; and calcining the dried catalyst.

25. The method of claim 24 wherein precipitating the catalyst precursor comprises adding a base solution to the solution consisting essentially of the iron salt and the copper salt and the at least one of aluminum salts and magnesium salts.

26. The method of claim 24 wherein precipitating the catalyst precursor comprises adding the solution consisting essentially of the iron salt and the copper salt and the at least one of aluminum salts and magnesium salts to a base solution.

27. The method of claim 24 wherein precipitating the catalyst precursor comprises cofeeding a base solution and the solution consisting essentially of the iron salt and the copper salt and the at least one of aluminum salts and magnesium salts.

28. The method of claim 24 wherein the precipitation solution consists essentially of an iron salt and a copper salt and at least one salt selected from the group consisting of aluminum salts and magnesium salts.

29. A method for preparing an iron catalyst to be used in a Fischer-Tropsch slurry reactor, the method comprising:

forming a catalyst precursor from an iron salt, and a copper salt, and at least one of aluminum salts and magnesium salts;

precipitating a promoted precursor from the catalyst precursor by adding a solution comprising potassium and a structural promoter to a slurry comprising the catalyst precursor, wherein the structural promoter is selected from the group consisting of potassium silicate, colloidal silica, TEOS, and polysilicic acid;

drying the promoted precursor to yield dried catalyst, wherein the dried catalyst comprises from about 1 wt % $SiO_2$ to about 2.2 wt % $SiO_2$; and calcining the dried catalyst.

30. The method of claim 29 wherein precipitating further comprises mixing a solution comprising TEOS with a solution comprising the iron salt and the copper salt and the at least one of aluminum salts and magnesium salts prior to precipitating the catalyst precursor.

* * * * *